United States Patent [19]
Hyde et al.

[11] Patent Number: 6,045,895
[45] Date of Patent: Apr. 4, 2000

[54] MULTILAYER FILMS HAVING PRESSURE SENSITIVE ADHESIVE LAYERS

[75] Inventors: Patrick D. Hyde, Burnsville; Richard A. Kollaja, St. Paul, both of Minn.; Dennis L. Krueger, Hudson, Wis.; Douglas A. Devens, Jr., St. Paul; Gregory B. Gadbois, Maplewood, both of Minn.

[73] Assignee: 3M Innovative Properties Company, St. Paul, Minn.

[21] Appl. No.: 08/980,920

[22] Filed: Dec. 1, 1997

[51] Int. Cl.$^7$ ........................................... B32B 7/02
[52] U.S. Cl. ..................... 428/213; 428/214; 428/215; 428/216; 428/354; 428/480; 428/40.1; 428/910
[58] Field of Search ................................ 428/213, 214, 428/215, 216, 354, 480, 40.1, 910, 77, 136

[56] References Cited

U.S. PATENT DOCUMENTS

| | | | |
|---|---|---|---|
| Re. 24,906 | 12/1960 | Ulrich | 206/59 |
| 2,736,721 | 2/1956 | Dexter | 260/42 |
| 3,565,985 | 2/1971 | Schrenk et al. | 264/171 |
| 3,691,140 | 9/1972 | Silver | 260/78.5 |
| 3,900,625 | 8/1975 | Chen | 428/110 |
| 4,197,069 | 4/1980 | Cloeren | 425/131.1 |
| 4,260,659 | 4/1981 | Gobran | 428/217 |
| 4,379,806 | 4/1983 | Korpman | 428/354 |
| 4,425,176 | 1/1984 | Shibano et al. | 156/244.11 |
| 4,488,619 | 12/1984 | O'Neill | 181/290 |
| 4,636,442 | 1/1987 | Beavers et al. | 428/480 |
| 4,770,320 | 9/1988 | Miles et al. | 221/33 |
| 4,792,480 | 12/1988 | Freund et al. | 428/286 |
| 4,801,514 | 1/1989 | Will et al. | 429/167 |
| 4,833,179 | 5/1989 | Young et al. | 522/183 |
| 4,837,088 | 6/1989 | Freedman | 156/243 |
| 4,894,259 | 1/1990 | Kuller | 427/208.8 |
| 4,906,421 | 3/1990 | Plamthottam et al. | 264/22 |
| 4,908,278 | 3/1990 | Bland et al. | 428/500 |
| 4,937,134 | 6/1990 | Schrenk et al. | 428/213 |
| 5,047,196 | 9/1991 | Zuckerberg et al. | 264/171 |
| 5,086,946 | 2/1992 | Blackwell et al. | 221/45 |
| 5,209,971 | 5/1993 | Babu et al. | 428/343 |
| 5,344,697 | 9/1994 | Romanowski | 428/247 |
| 5,389,324 | 2/1995 | Lewis et al. | 264/171 |
| 5,427,842 | 6/1995 | Bland et al. | 428/213 |
| 5,461,134 | 10/1995 | Leir et al. | 528/14 |
| 5,518,144 | 5/1996 | Samuelson et al. | 221/33 |
| 5,589,122 | 12/1996 | Leonard et al. | 264/146 |
| 5,660,922 | 8/1997 | Herridge et al. | 428/214 |
| 5,798,159 | 8/1998 | Callahan, Jr. et al. | 428/40.1 |

FOREIGN PATENT DOCUMENTS

| | | |
|---|---|---|
| 0 186 154 | 7/1986 | European Pat. Off. .......... B65D 1/28 |
| WO 95/17303 | 6/1995 | WIPO . |
| WO 96/08367 | 3/1996 | WIPO . |
| WO 96/08369 | 3/1996 | WIPO . |
| WO 97/23577 | 7/1997 | WIPO . |

OTHER PUBLICATIONS

P. Cloeren, Jr., "Feedblock Coextrusion Systems", TAPPI Seminar Notes, 1986, pp. 55–66.

C. Rauwendaal, Polymer Extrusion, 1986, pp. 453–456.

W.J. Schrenk, "Flow Problems in Multilayer Coextrusion", Society of Plastics Engineers, Technical Conference, Oakbrook, Ill., Jun. 20–22, 1977, pp. 25, 27–34.

Grant, Roger: Grant, Claire: Grant and Hackh's Chemical Dictionary, Fifth Edition: p. 461, 1987: McGraw–Hill Inc.

*Primary Examiner*—William Krynski
*Assistant Examiner*—B. Shewareged
*Attorney, Agent, or Firm*—Douglas B. Little

[57] ABSTRACT

The present invention provides unified multilayer films having at least one internal layer that includes a pressure sensitive adhesive material. Preferably, multilayer films of the present invention are no greater than about 250 micrometers ($\mu$m) thick. In particularly preferred embodiments of the present invention, multilayer films include layers that include a pressure sensitive adhesive material alternating with layers that include a material that is not a pressure sensitive adhesive. In other preferred embodiments, multilayer films include alternating layers of different pressure sensitive adhesive materials.

32 Claims, 6 Drawing Sheets

MULTILAYER FILMS HAVING PRESSURE SENSITIVE ADHESIVE LAYERS

TECHNICAL FIELD

This invention relates to multilayer films having pressure sensitive adhesive layers, and more particularly, to multilayer films having alternating layers of material that is a pressure sensitive adhesive and material that is not a pressure sensitive adhesive or alternating layers of different pressure sensitive adhesive materials.

BACKGROUND OF THE INVENTION

There is an ongoing need for pressure sensitive adhesive products (e.g., pressure sensitive tapes and sheeting) having a variety of new properties not possessed by current products. One way to achieve new properties or tailor the properties of a pressure sensitive adhesive products through the use of multilayer constructions.

Products having more than one layer of pressure sensitive adhesive have been described. For example, products are known that consist of layer of a higher modulus pressure sensitive adhesive and a layer of a lower modulus pressure sensitive adhesive. The higher modulus layer provides resistance to creep and the lower modulus layer provides tack.

Multilayer films, both with and without pressure sensitive layers, have also been described. For example, nonpressure sensitive adhesive constructions having up to several thousand layers of alternating polymers with different refractive indices have been shown to have mirror-like properties. Also, films that have tear or puncture resistance have been made by using alternating layers of stiff and ductile polymers. Pressure sensitive adhesive tapes are also known that have multilayered films as the backings on which the pressure sensitive adhesive is coated.

Intermediate layers may be used in a multilayered construction to adhere different polymeric materials having insufficient interlayer adhesion. Intermediate layers, or tie layers, generally have an affinity for both of the principle layers and typically consist of materials that will not significantly reduce the overall tensile properties of the multilayer construction. Some useful tie layers include, for example, copolymers containing blocks that have an affinity for each of the principle layers, which flow when melted and cool to a tack-free state. Tie-layer adhesives are typically hot melt adhesives as opposed to pressure sensitive adhesives.

Although a variety of properties have been accomplished with such pressure sensitive adhesive tapes, there is still a need for pressure sensitive adhesive products, particularly multilayered products.

SUMMARY OF THE INVENTION

The present invention provides unified multilayer films of organic polymeric material having at least five layers and at least one internal layer of a pressure sensitive adhesive material. Preferably, multilayer films of the present invention are no greater than about 250 micrometers ($\mu$m) thick. In particularly preferred embodiments of the present invention, multilayer films have a construction of layers that include a pressure sensitive adhesive material alternating with layers that include a material that is not a pressure sensitive adhesive. In other preferred embodiments, multilayer films have a construction of alternating layers of different pressure sensitive adhesive materials. For example, the construction can include layers of a first pressure sensitive adhesive material alternating with layers of a second pressure sensitive adhesive material.

In any one construction of the alternating layers of pressure sensitive adhesive material and material that is not a pressure sensitive adhesive, each of the pressure sensitive adhesive layers typically includes the same material or combination of materials, although they may include different materials or combinations of materials. Similarly, each of the layers that is not a pressure sensitive adhesive typically includes the same material or combination of materials, although they may include different materials or combinations of materials.

Preferably, multilayer films of the present invention have a unified construction of at least 10 substantially contiguous layers of organic polymeric material, more preferably, at least 13 layers, even more preferably, at least 29 layers, although as few as 5 layers are possible. In certain embodiments, there are at least three layers of the same pressure sensitive adhesive material and often, at least three layers of the same material that is not a pressure sensitive adhesive material. In other embodiments, all of the layers of pressure sensitive adhesive include the same pressure sensitive adhesive material.

Each pressure sensitive adhesive layer can include a mixture (e.g., blend) of two or more different pressure sensitive adhesive materials. Alternatively, each pressure sensitive adhesive layer can include a mixture (e.g., blend) of at least one pressure sensitive adhesive material and at least one material that is not a pressure sensitive adhesive, so long as the mixture has pressure sensitive properties.

The two outermost layers of multilayer films of the present invention can include one or more pressure sensitive adhesive materials, which may be the same or different in each of the two outermost layers. Alternatively, the two outermost layers can include one or more materials that are not pressure sensitive adhesives, which may be the same or different in each of the two outermost layers. Furthermore, the inventive films include embodiments in which only one of the outermost layers includes one or more pressure sensitive adhesive materials.

Multilayer films of the present invention can also be oriented, either in one or two directions, if so desired. In certain embodiments of the present invention, the multilayer films can include a layer that is not a pressure sensitive adhesive, a pressure sensitive adhesive layer, and a tie layer therebetween. In other preferred embodiments, at least one layer can include a flame retardant.

The present invention also provides a process of preparing a multilayer film. The process includes melt processing organic polymeric material to form a unified construction of at least 10 substantially contiguous layers of organic polymeric material, wherein at least one internal layer of the organic polymeric material comprises a pressure sensitive adhesive material. Preferably, all the layers are substantially simultaneously melt processed, and more preferably, all the layers are substantially simultaneously coextruded.

One aspect of the present invention provides a multilayer film having a unified construction of at least 10 substantially contiguous layers of organic polymeric material, wherein at least one internal layer comprises a pressure sensitive adhesive material.

Another aspect of the present invention provides a multilayer film having a unified construction and a total thickness of no greater than about 250 micrometers; wherein the construction comprises at least 5 substantially contiguous layers of organic polymeric material; the construction comprising layers comprising a pressure sensitive adhesive material alternating with layers comprising a material that is not a pressure sensitive adhesive.

Yet another aspect of the present invention provides a process of preparing a multilayer film, the process comprising melt processing organic polymeric material to form a unified construction of at least 10 substantially contiguous layers of organic polymeric material, wherein at least one internal layer of the organic polymeric material comprises a pressure sensitive adhesive material.

A further aspect of the present invention provides a process of preparing a multilayer film, the process comprising melt processing organic polymeric material to form a unified construction of at least 5 substantially contiguous layers of organic polymeric material, the construction comprises layers comprising a pressure sensitive adhesive material alternating with layers comprising a material that is not a pressure sensitive adhesive.

Yet a further aspect of the present invention provides a process of preparing a multilayer film, the process comprising melt processing organic polymeric material to form a unified construction of at least 5 substantially contiguous and alternating layers of different pressure sensitive adhesive materials.

Herein, the following definitions are used:

"Unified" means that the layers are not designed to be separated or delaminated as would a pressure sensitive adhesive tape in roll form.

"Pressure sensitive adhesive" means an adhesive that displays permanent and aggressive tackiness to a wide variety of substrates after applying only light pressure. It has a four-fold balance of adhesion, cohesion, stretchiness, and elasticity, and is normally tacky at use temperatures, which is typically room temperature (i.e., about 20° C. to about 30° C.). A pressure sensitive adhesive also typically has an open time tack (i.e., period of time during which the adhesive is tacky at room temperature) on the order of days and often months or years. An accepted quantitative description of a pressure sensitive adhesive is given by the Dahlquist criterion line (as described in *Handbook of Pressure Sensitive Adhesive Technology*, Second Edition, D. Satas, ed., Van Nostrand Reinhold, New York, N.Y., 1989, pages 171–176), which indicates that materials having a storage modulus (G') of less than about $3 \times 10^5$ Pascals (measured at 10 radians/second at a temperature of about 20° C. to about 22° C.) typically have pressure sensitive adhesive properties while materials having a G' in excess of this value typically do not.

"Nonpressure sensitive adhesive" means nontacky polymeric material as well as tacky polymeric materials, when in the melt state, that do not display pressure sensitive properties, or other materials that have adhesive properties at room temperature but do not meet the Dahlquist criterion as described above. Such materials have a storage modulus (G') of at least about $3 \times 10^5$ Pascals (measured at 10 radians/second at a room temperature of about 20° C. to about 22° C.). These materials can be nontacky thermoplastic materials, which can be elastomeric or nonelastomeric. Alternatively, they can be nontacky elastomers.

"Melt viscosity" means the viscosity of molten material at the processing temperatures and shear rates employed.

DETAILED DESCRIPTION OF PREFERRED EMBODIMENTS

Figure 1:
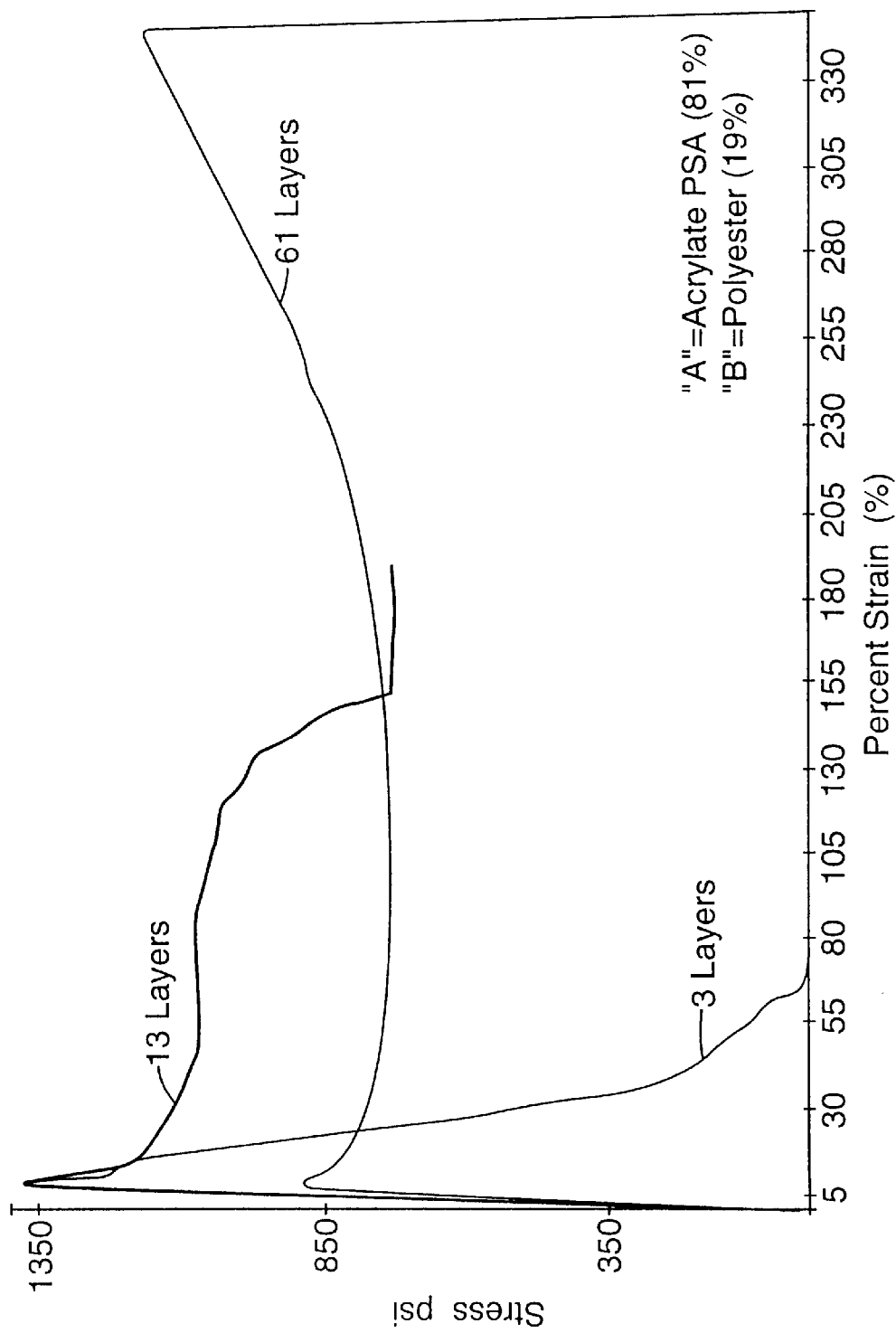
FIG. 1 is a graph of the tensile strength and the percent elongation for multilayer constructions of alternating layers of an acrylate pressure sensitive adhesive and an amorphous polyester having similar compositions and having 3, 13, and 61 layers as exemplified in Comparative Example M and Examples 33–34, respectively.

The present invention is directed to multilayer products (e.g., a single- or double-sided pressure sensitive adhesive tape or sheeting, a backing for a tape or sheeting or a pressure sensitive adhesive film) in the form of films of organic polymeric material, wherein the films have at least one internal layer that includes a pressure sensitive adhesive material. Each of the other layers may include a pressure sensitive adhesive material, a material that is not a pressure sensitive adhesive (also referred to herein as a "nonpressure sensitive adhesive material"), or both. In certain preferred embodiments there are layers that include pressure sensitive adhesive materials alternating with layers that include materials that are not pressure sensitive adhesives. In other preferred embodiments there are alternating layers of different pressure sensitive adhesive materials (e.g., alternating layers of two different pressure sensitive adhesive materials). The two outermost layers of the films may include pressure sensitive adhesive materials, materials that are not pressure sensitive adhesives, or one of the outermost layers may include a pressure sensitive adhesive material and the other a material that is not a pressure sensitive adhesive. Each layer of the construction is continuous and has a substantially contiguous relationship to the adjacent layers. Preferably, each layer is substantially uniform in thickness. The multiple layers in any one construction are "unified" into a single multilayer film such that the layers do not readily separate.

The layers that include a pressure sensitive adhesive material may include mixtures of different pressure sensitive adhesives or materials that are not pressure sensitive adhesives, as long as the mixture has pressure sensitive adhesive properties, as defined above. The layers that include a material that is not a pressure sensitive adhesive may include mixtures of different materials that are not pressure sensitive adhesives and may even include pressure sensitive adhesive materials, as long as the mixture does not have pressure sensitive adhesive properties.

These multilayer products (i.e., multilayer films) are typically prepared by melt processing (e.g., extruding). In a preferred method, the layers are generally formed at the same time, joined while in a molten state, and cooled. That is, preferably, the layers are substantially simultaneously melt-processed, and more preferably, the layers are substantially simultaneously coextruded. Products formed in this way possess a unified construction and have a wide variety of useful, unique, and unexpected properties, which provide for a wide variety of useful, unique, and unexpected applications.

Preferably, the films are no greater than about 250 micrometers (pm) thick (more preferably, no greater than about 150 μm, and most preferably, no greater than about 50 μm). Such multilayer products have a construction of at least 5 layers, preferably, at least 10 layers, more preferably, at least 13 layers, and even more preferably, at least 29 layers. Depending on the materials and additives chosen, thicknesses of the layers, and processing parameters used, for example, the multilayer films will typically have different properties at different numbers of layers. That is, the same property (e.g., tensile strength, fire retardancy) may go through maximum at a different number of layers for two particular materials when compared to two other materials.

Multilayer films can include an $(AB)_n$ construction, with either A and/or B layers as the outermost layers (e.g., $(AB)_nA$, $(BA)_nB$, or $(AB)_n$). In such constructions, each of the A layers has pressure sensitive adhesive properties as a result of the incorporation of a pressure sensitive adhesive, which may be the same or different in each layer, and each of the B layers does not have pressure sensitive adhesive properties as a result of incorporation of a material that is not a pressure sensitive adhesive, which may be the same or different in each layer. Multilayer films can also include an $(AA')_n$ construction, with A and/or A' layers as the outermost layers (e.g., $(AA')_nA$, $(A'A)_nA'$, or $(AA')_n$). In such constructions, each of the A and A' layers includes a different pressure sensitive adhesive. In each of these constructions, n is preferably at least 2, and more preferably, at least 5, depending on the materials used and the application desired.

In embodiments with alternating different pressure sensitive adhesive layers $(AA')_n$, the multilayer films can take advantage of the properties of each of the pressure sensitive adhesive materials. For example, a construction with alternating layers of an acrylate pressure sensitive adhesive and a styrene-isoprene-styrene pressure sensitive adhesive has the UV resistance of the acrylate adhesive, with improved adhesion imparted by the styrene-isoprene-styrene adhesive, and a level of adhesion that is intermediate between the two different pressure sensitive adhesives.

Preferred embodiments include three or more layers of the same pressure sensitive adhesive material and three or more layers of the same material that is not a pressure sensitive adhesive. More preferred embodiments include only two types of materials, one pressure sensitive adhesive and one that is not a pressure sensitive adhesive in alternating layers. Other preferred embodiments include only two different pressure sensitive adhesives in alternating layers.

Depending on whether the outer layers are both tacky or nontacky, or whether only one of the outer layers is tacky and one is nontacky, the multilayer films can be used as single- or double-sided pressure sensitive adhesive tapes, nonadhesive films for use as backings for tapes, or pressure sensitive adhesive films for use as adhesive layers in tapes, for example. For preferred embodiments, there are generally no more than about 500 layers, more preferably, no more than about 200 layers, and most preferably, no more than about 100 layers, although it is envisioned that constructions having many more layers can be made using the materials and methods described herein.

The individual layers of multilayer films of the present invention can be of the same or different thicknesses. Preferably, each internal layer is no greater than about 5 micrometers (μm) thick, and more preferably, no greater than about 1 μm thick. Each of the two outermost layers can be significantly thicker than any of the inner layers, however. Preferably, each of the two outermost layers is no greater than about 150 μm thick. Typically, each layer, whether it be an internal layer or one of the outermost layers, is at least about 0.01 μm thick, depending upon the materials used to from the layer and the desired application.

Multilayer films wherein one or both of the outer layers is a pressure sensitive adhesive can be made that have many significant and unexpected properties. These include, for example, controlled adhesion, relatively high shear resistance, good die-cuttability, good weatherability, relatively low material costs, good flame resistance, and sufficient tensile strength for handling when used as a pressure sensitive adhesive transfer tape. Multilayer films wherein both of the outer layers are not pressure sensitive adhesives can also be made that have many unexpected properties. These include, for example, relatively high break elongation and toughness, relatively high yield and break stress, good flame resistance, good drape and softness, good stretch release properties, and paper-like tensile, elongation and tear properties. Each multilayer film of the present invention will not necessarily have all of these advantageous properties. This will depend on the number of layers, the types of materials, the affinity of the materials for each other, the modulus of the different materials, and the like.

Thus, certain multilayer films of the present invention can be used as backings or supports for tapes. This is because they have advantageous mechanical properties, tensile strength, a relatively high break elongation (i.e., elongation at break) and toughness, good yield and break stress, as well as beneficial tear properties. Such desirable properties are believed to result from the incorporation of an inner layer of a pressure sensitive adhesive. This is unexpected because a pressure sensitive adhesive typically has poor mechanical properties and tensile strength.

Certain multilayer films of the present invention can be used as adhesive layers in tapes, particularly pressure sensitive adhesive layers. This is because they have sufficient conformability and adhesion to a wide variety of surfaces. Typically, pressure sensitive adhesives flow easily and are sufficiently thick to conform to irregular surfaces. Surprisingly, these properties are not detrimentally affected by including inner layers of a nonpressure sensitive adhesive, which typically have less flowability and conformability.

Significantly, for multilayer films having an outer pressure sensitive adhesive layer, this layer can be substantially thinner than in conventional constructions. Typically, a pressure sensitive adhesive layer is at least about 25 micrometers thick for sufficient tack; however, because there are inner pressure sensitive adhesive layers that contribute to the overall conformability of the film, the outer pressure sensitive adhesive layer of the multilayer films of the present invention can be as thin as 2 micrometers or less.

Suitable materials for use in preparing the films of the present invention, whether they are pressure sensitive adhesives or not pressure sensitive adhesives, are melt processable. That is, they are fluid or pumpable at the temperatures used to melt process the films (e.g., about 50° C. to about 300° C.), and they are film formers. Furthermore, suitable materials do not significantly degrade or gel at the temperatures employed during melt processing (e.g., extruding or compounding). Preferably, such materials have a melt viscosity of about 10 poise to about 1,000,000 poise, as measured by capillary melt rheometry at the processing temperatures and shear rates employed in extrusion. Typically, suitable materials possess a melt viscosity within this range at a temperature of about 175° C. and a shear rate of about 100 seconds$^{-1}$.

In melt processing multilayer films of the present invention, the materials in adjacent layers need not be chemically or physically compatible or well matched, particularly with respect to melt viscosities, although they can be if so desired. That is, although materials in adjacent polymeric flowstreams can have relative melt viscosities (i.e., ratio of their viscosities) within a range of about 1:1 to about 1:2, they do not need to have such closely matched melt viscosities. Rather, the materials in adjacent polymeric flowstreams can have relative melt viscosities of at least about 1:5, and often up to about 1:20. For example, the melt viscosity of a flowstream of polymer B (or A) can be similar or at least about 5 times, and even up to about 20 times, greater than the melt viscosity of an adjacent flowstream of polymer A (or B). As a specific example, an acrylate pressure sensitive adhesive layer having a melt viscosity of about 1500 poise can be coextruded with a polyester having a melt viscosity of about 30,000 poise at the same processing temperature.

In melt processing films of different pressure sensitive adhesives, the differences in elastic stresses generated at the interface between the layers of different pressure sensitive adhesives is also important. Preferably, these elastic differences are minimized to reduce or eliminate flow instabilities that can lead to layer breakup. With knowledge of a material's elasticity, as measured by the storage modulus on a rotational rheometer over a range of frequencies (0.001 rad/sec.<w<100 rad/sec.) at the processing temperature, along with its viscosity at shear rates less than 0.01 second$^{-1}$, and the degree to which the material's viscosity decreases with shear rate, one of skill in the art can make judicious choices of the relative thicknesses of the layers, the die gap, and the flow rate to obtain a film with continuous, uniform layers.

Significantly, relatively incompatible materials (i.e., those that typically readily delaminate as in conventional two layer constructions) can be used in the multilayer films of the present invention. Although they may not be suitable for all constructions, they are suitable for the constructions having larger numbers of layers. That is, generally as the number of layers increases, relatively incompatible materials can be used without delamination occurring. For example, a 50 micrometer thick (AB)$_2$A multilayer construction, where A is a tackified styrene-isoprene-styrene pressure sensitive adhesive and B is a linear low density polyethylene, will tend to delaminate, i.e., separate at interfaces of the layers, when peeled from a glass surface. However, an (AB)$_{30}$A multilayer construction of the same overall thickness and materials will not generally delaminate when peeled from a glass surface in a similar manner, resulting in relatively higher shear cohesive strength. In addition, film properties such as elongation at break and toughness often increase as the number of layers increases, depending on the materials used.

Pressure sensitive adhesives useful in multilayer films of the present invention can be any material that has pressure sensitive adhesive properties as described above at use temperatures, which are typically about room temperature (i.e., about 20° C. to about 30° C.). Generally, although not necessarily, particularly useful pressure sensitive adhesives are amorphous with a glass transition temperature (Tg) of less than about 20° C.

The pressure sensitive adhesive layer (A or A') can include a single pressure sensitive adhesive, a mixture (e.g., blend) of several pressure sensitive adhesives, or a mixture (e.g., blend) of a pressure sensitive adhesive and a material that is not a pressure sensitive adhesive (e.g., a nontacky thermoplastic material, which may or may not be elastomeric), as long as the layer has pressure sensitive adhesive properties. Examples of some pressure sensitive adhesive blends are described in International Publication Nos. WO 97/23577, 97/23249, and 96/25469, all assigned to the Minnesota Mining and Manufacturing Company (3M), St. Paul, Minn. Similarly, the nonpressure sensitive adhesive layer (B) can include a single material that is not a pressure sensitive adhesive, a mixture of several such materials, or a mixture of a material that is not a pressure sensitive adhesive with a pressure sensitive adhesive, as long as the layer does not have pressure sensitive properties.

Pressure sensitive adhesives useful in the present invention can be self tacky or require the addition of a tackifier. Such materials include, but are not limited to, tackified natural rubbers, tackified synthetic rubbers, tackified styrene block copolymers, self-tacky or tackified acrylate or methacrylate copolymers, self-tacky or tackified poly-α-olefins, and tackified silicones. Examples of suitable pressure sensitive adhesives are described in U.S. Pat. No. Re 24,906 (Ulrich), U.S. Pat. No. 4,833,179 (Young et al.), U.S. Pat. No. 5,209,971 (Babu et al.), U.S. Pat. No. 2,736,721 (Dexter), and U.S. Pat. No. 5,461,134 (Leir et al.), for example. Others are described in the *Encyclopedia of Polymer Science and Engineering*, vol. 13, Wiley-Interscience Publishers, New York, 1988, and the *Encyclopedia of Polymer Science and Technology*, vol. 1, Interscience Publishers, New York, 1964.

Useful natural rubber pressure sensitive adhesives generally contain masticated natural rubber, one or more tackifying resins, and one or more antioxidants. Useful synthetic rubber adhesives are generally rubbery elastomers, which are either inherently tacky or nontacky and require tackifiers. Inherently tacky (i.e., self-tacky) synthetic rubber pressure sensitive adhesives include for example, butyl rubber, a copolymer of isobutylene with less than 3 percent isoprene, polyisobutylene, a homopolymer of isoprene, polybutadiene, or styrene/butadiene rubber.

Styrene block copolymer pressure sensitive adhesives generally comprise elastomers of the A-B or A-B-A type, wherein, in this context, A represents a thermoplastic polystyrene block and B represents a rubbery block of polyisoprene, polybutadiene, or poly(ethylene/butylene), and tackifying resins. Examples of the various block copolymers useful in block copolymer pressure sensitive adhesives include linear, radial, star, and tapered block copolymers. Specific examples include copolymers such as those available under the trade designations KRATON from Shell Chemical Co., Houston, Tex., and EUROPRENE SOL from EniChem Elastomers Americas, Inc., Houston, Tex. Examples of tackifying resins for use with such styrene block copolymers include aliphatic olefin-derived resins, rosin esters, hydrogenated hydrocarbons, polyterpenes, terpene phenolic resins derived from petroleum or terpentine sources, polyaromatics, coumarone-indene resins, and other resins derived from coal tar or petroleum and having softening points above about 85° C.

(Meth)acrylate (i.e., acrylate and methacrylate or "acrylic") pressure sensitive adhesives generally have a glass transition temperature of about −20° C. or less and typically include an alkyl ester component such as, for example, isooctyl acrylate, 2-ethyl-hexyl acrylate, and n-butyl acrylate, and a polar component such as, for example, acrylic acid, methacrylic acid, ethylene vinyl acetate, and N-vinyl pyrrolidone. Preferably, acrylic pressure sensitive adhesives comprise about 80 wt-% to about 100 wt-% isooctyl acrylate and up to about 20 wt-% acrylic acid. The acrylic pressure sensitive adhesives may be inherently tacky or tackified using a tackifier such as a rosin ester, an aliphatic resin, or a terpene resin.

Poly-α-olefin pressure sensitive adhesives, also called poly(1-alkene) pressure sensitive adhesives, generally comprise either a substantially uncrosslinked polymer or an uncrosslinked polymer that may have radiation activatable functional groups grafted thereon as described in U.S. Pat. No. 5,209,971 (Babu et al.). Useful poly-α-olefin polymers include, for example, $C_3$–$C_8$ poly(1-alkene) polymers. The poly-α-olefin polymer may be inherently tacky and/or include one or more tackifying materials such as resins derived by polymerization of $C_5$–$C_9$ unsaturated hydrocarbon monomers, polyterpenes, synthetic polyterpenes, and the like.

Silicone pressure sensitive adhesives comprise two major components, a polymer or gum and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Silicone pressure sensitive adhesives are described in U.S. Pat. No. 2,736,721 (Dexter). Silicone urea block copolymer pressure sensitive adhesive are described in U.S. Pat. No. 5,461,134 (Leir et al.), International Publication Nos. WO 96/34029 and 96/35458.

Nonpressure sensitive adhesive polymeric materials used in the multilayer films of the present invention include one or more thermoplastic materials, which may or may not be elastomeric materials, and elastomers. These may be adhesive (i.e., tacky) when in the melt state or nonadhesive (i.e., nontacky) materials, as long as the adhesive materials are not pressure sensitive, as defined above.

Thermoplastic materials are generally materials that flow when heated sufficiently above their glass transition temperature, or if semicrystalline, above their melt temperatures, and become solid when cooled. They may be elastomeric or nonelastomeric. Thermoplastic materials useful in the present invention that are generally considered nonelastomeric include, for example, polyolefins such as isotactic polypropylene, low density polyethylene, linear low density polyethylene, very low density polyethylene, medium density polyethylene, high density polyethylene, polybutylene, nonelastomeric polyolefin copolymers or terpolymers such as ethylene/propylene copolymer and blends thereof; ethylene-vinyl acetate copolymers such as those available under the trade designation ELVAX 260 from E. I. DuPont de Nemours, Inc., Wilimington, Del.; ethylene acrylic acid copolymers; ethylene methacrylic acid copolymers such as those available under the trade designation SURLYN 1702 from E. I. DuPont de Nemours, Inc.; polymethylmethacrylate; polystyrene; ethylene vinyl alcohol; polyesters including amorphous polyester; polyamides; fluorinated thermoplastics such as polyvinylidene fluoride, polytetrafluoroethylene, and fluorinated ethylene/propylene copolymers; halogenated thermoplastics such as chlorinated polyethylene; polyether-block-amides such as those available under the trade designation PEBAX 5533 from Elf-Atochem North America, Inc. Philadelphia, Pa.

Thermoplastic materials that have elastomeric properties are typically called thermoplastic elastomeric materials. Thermoplastic elastomeric materials are generally defined as materials that act as though they were covalently crosslinked at ambient temperatures, exhibiting high resilience and low creep, yet process like thermoplastic nonelastomers and flow when heated above their softening point. Thermoplastic elastomeric materials useful in the multilayer films of the present invention include, for example, linear, radial, star, and tapered block copolymers such as those listed above with respect to pressure sensitive adhesives (e.g., styrene-isoprene block copolymers, styrene-(ethylene-butylene) block copolymers, styrene-(ethylene-propylene) block copolymers, and styrene-butadiene block copolymers); polyetheresters such as that available under the trade designation HYTREL G3548 from E. I. DuPont de Nemours, Inc.; elastomeric ethylene-propylene copolymers; thermoplastic elastomeric polyurethanes such as that available under the trade designation MORTHANE URETHENE PE44-203 from Morton International, Inc., Chicago, Ill.; polyvinylethers; poly-α-olefin-based thermoplastic elastomeric materials such as those represented by the formula —$(CH_2CHR)_x$ where R is an alkyl group containing 2 to 10 carbon atoms, and poly-α-olefins based on metallocene catalysis such as ENGAGE EG8200, ethylene/poly-α-olefin copolymer available from Dow Plastics Co., Midland, Mich.

Elastomers, as used herein, are distinct from thermoplastic elastomeric materials in that the elastomers require crosslinking via chemical reaction or irradiation to provide a crosslinked network which imparts modulus, tensile strength, and elastic recovery. Elastomers useful in the present invention include, for example, natural rubbers such as CV-60, a controlled viscosity grade of rubber, and SMR-5, a ribbed smoked sheet rubber; butyl rubbers, such as Exxon Butyl 268 available from Exxon Chemical Co., Houston, Tex.; synthetic polyisoprenes such as CARIFLEX, available from Shell Oil Co., Houston, Tex., and NATSYN 2210, available from Goodyear Tire and Rubber Co., Akron, Ohio; ethylene-propylenes; polybutadienes; polybutylenes; polyisobutylenes such as VISTANEX MM L-80, available from Exxon Chemical Co.; and styrene-butadiene random copolymer rubbers such as AMERIPOL SYNPOIL 1011 A, available from American Synpol Co., Port Neches, Tex.

The materials of the nonpressure sensitive adhesive layer (B) can be modified with one or more processing aids, such as plasticizers, to modify their properties without making them pressure sensitive adhesives. Plasticizers useful with the polymeric materials are preferably miscible at the molecular level, i.e., dispersible or soluble in the thermoplastic material. Examples of plasticizers include, but are not limited to, polybutene, paraffinic oils, petrolatum, liquid rubbers, and certain phthalates with long aliphatic side chains such as ditridecyl phthalate. When used, a processing aid is typically present in an amount of about 5 parts to about 300 parts by weight, and preferably up to about 200 parts by weight, based on 100 parts by weight of the polymeric material in the nonpressure sensitive adhesive layer.

Other additives, such as fillers, pigments, crosslinking agents, flame-retardants, antioxidants, ultraviolet stabilizers, and the like, may be added to modify the properties of either the pressure sensitive adhesive layers (A or A') or the nonpressure sensitive adhesive layers (B). Each of these additives is used in an amount to produce the desired result.

Pigments and fillers can be used to modify cohesive strength and stiffness, cold flow, and tack, as well as chemical resistance and gas permeability. For example, aluminum hydrate, lithopone, whiting, and the coarser carbon blacks such as thermal blacks also increase tack with moderate increase in cohesivity, whereas clays, hydrated silicas, calcium silicates, silico-aluminates, and the fine furnace and thermal blacks increase cohesive strength and stiffness. Platy pigments and fillers, such as mica, graphite, and talc, are preferred for acid and chemical resistance and low gas permeability. Other fillers can include glass or polymeric beads or bubbles, metal particles, fibers, and the like. Typically, pigments and fillers are used in amounts of about 0.1% to about 20% by weight, based on the total weight of the multilayer film.

Crosslinkers such as benzophenone, derivatives of benzophenone, and substituted benzophenones such as acryloyloxybenzophenone may also be added. Such crosslinkers are preferably not thermally activated, but are activated by a source of radiation such as ultraviolet or electron-beam radiation subsequent to forming the films. Typically, crosslinkers are used in amounts of about 0.1% to about 5.0% by weight, based on the total weight of the multilayer film.

Flame retardants may be added to incorporate resistance to flame initiation or flame propagation in the constructions of the invention. Examples include brominated aromatic compounds, such as decabromodiphenyloxide available under the trade designation DE83R from Great Lakes, W. Lafayette, Ind., antimony compounds, such as antimony trioxide or antimony pentoxide, and aluminum trihydrate, such as that available under the trade designation MICRAL ATH 1500 from Solem Ind., Norcross, Ga. Typically, flame retardants are used in amounts of about 1% to about 50% by weight, based on the total weight of the multilayer film. A flame retardant polyethylene concentrate is commercially available under the trade designation PE concentrate 1 Nat-2P-W from M. A. Hannah Corp., Elk Grove, Ill., which contains an antimony based flame retardant.

Antioxidants and/or ultraviolet stabilizers may be used to protect against severe environmental aging caused by ultraviolet light or heat. These include, for example, hindered phenols, amines, and sulfur and phosphorus hydroxide decomposers. Typically, antioxidants and/or ultraviolet stabilizes are used in amounts of about 0. 1% to about 5.0% by weight, based on the total weight of the multilayer film.

Tie layers, which are typically hot melt adhesive (i.e., tacky when in the melt state), can also be used to enhance the adhesion between each of the layers if so desired. Materials useful in the tie layers include, ethylene/vinyl acetate copolymer (preferably containing at least about 10% by weight of vinyl acetate units), carboxylated ethylene/vinyl acetate copolymer such as that available under the trade designation CXA 3101, from E. I. DuPont de Nemours, Inc., copolymers of ethylene and methyl acrylate such as that commercially available under the trade designation POLY-ETH 2205 EMA, from Gulf Oil and Chemicals Co., ethylene/acrylic acid copolymer such as that available under the trade designation SURLYN (a copolymer of ethylene with a methyl acrylate) from E. I. DuPont de Nemours, Inc., maleic anhydride modified polyolefins and copolymers of polyolefins such as that commercially available under the trade designation MODIC, from Mitsubishi Chemical Co., polyolefins containing homogeneously dispersed vinyl polymers such as those commercially available under the trade designation VMX from Mitsubishi Chemical Co. (e.g., FN-70, an ethylene/vinyl acetate based product having a total vinyl acetate content of 50% and JN-70, an ethylene/vinyl acetate based product containing dispersed polymethylmethacrylate and having a vinyl acetate content of 23% and a methyl methacrylate content of 23%), POLYBOND (believed to be a polyolefin grafted with acrylic acid) from B. P. Chemicals Inc., Cleveland, Ohio, PLEXAR (believed to be a polyolefin grafted with functional groups) from Quantum Chemicals, Inc., Cincinnati, Ohio, a copolymer of ethylene and acrylic acid such as that commercially available under the trade designation PRIMACOR from Dow Chemical Co., Midland, Mich., and a copolymer of ethylene and methacrylic acid such as that commercially available under the trade designation NUCREL from E. I. DuPont de Nemours, Inc.

The multilayer films of the present invention can be prepared directly by extrusion, for example, with the outermost layers being generally nontacky, as a result of both layers including a nonpressure sensitive adhesive material. Alternatively, the films can be made with the outermost layers being tacky, as a result of both layers including a pressure sensitive adhesive material. One or both of the outermost pressure sensitive adhesive layers can be subsequently detackified, however. This can be done by coating the pressure sensitive adhesive layer(s) with a particulate material such as corn starch, for example. Alternatively, one or both of the outermost pressure sensitive adhesive layers can be removed using an organic solvent if so desired.

The multilayer films of the present invention can be used as the backings or substrates for single-sided or double-sided adhesive products, such as tapes. Such films can be prepared using extrusion techniques, for example, to produce such products directly (i.e., with one or both outermost layers of the film being a pressure sensitive adhesive layer). Alternatively, a multilayer film with nontacky outer layers can be coated with an adhesive material using conventional coating techniques. Furthermore, such products can be coated with a low-adhesion backsize (LAB) material, which restricts adhesion of various types of surfaces to the film when it is wound as a coil or is stacked on itself. A wide variety of known adhesive materials (e.g., any of the pressure sensitive materials described herein) and LAB materials (e.g., polyolefins, urethanes, cured silicones, fluorochemicals) can be used as well as a wide variety of known coating techniques, including solvent coating and extrusion coating techniques.

Multilayer films of the present invention can be made using a variety of equipment and a number of melt-processing techniques (typically, extrusion techniques) well known in the art. Such equipment and techniques are disclosed, for example, in U.S. Pat. No. 3,565,985 (Schrenk et al.), U.S. Pat. No. 5,427,842 (Bland et al.), U.S. Pat. No. 5,589,122 (Leonard et al.), U.S. Pat. No. 5,599,602 (Leonard et al.), and U.S. Pat. No. 5,660,922 (Herridge et al.). For example, single- or multi-manifold dies, full moon feedblocks (such as those described in U.S. Pat. No. 5,389,324 to Lewis et al.), or other types of melt processing equipment can be used, depending on the number of layers desired and the types of materials extruded. For extruding pressure sensitive adhesives, for example, slab feed extruders are typically used.

For example, one technique for manufacturing multilayer films of the present invention can use a coextrustion technique, such as that described in International Publication No. WO 93/07228 or U.S. Pat. No. 5,660,922 (Herridge et al.). In a coextrusion technique, various molten streams are transported to an extrusion die outlet and joined together in proximity of the outlet. Extruders are in effect the "pumps" for delivery of the molten streams to the extrusion die. The precise extruder is generally not critical to the process. A number of useful extruders are known and include single and twin screw extruders, batch-off extruders, and the like. Conventional extruders are commercially available from a variety of vendors such as Davis-Standard Extruders, Inc. (Pawcatuck, Conn.), Black Clawson Co. (Fulton, N.Y.), Berstorff Corp. (N.C.), Farrel Corp. (Conn.), and Moriyama Mfr. Works, Ltd. (Osaka, Japan).

Other pumps may also be used to deliver the molten streams to the extrusion die. They include drum loaders, bulk melters, gear pumps, and the like, and are commercially available from a variety of vendors such as Graco LTI (Monterey, Calif.), Nordson (Westlake, Calif.), Industrial Machine Manufacturing (Richmond, Va.), and Zenith Pumps Div., Parker Hannifin Corp. (N.C.).

Typically, a feedblock combines the molten streams into a single flow channel. The distinct layers of each material are maintained because of the laminar flow characteristics of the streams. The molten structure then passes through an extrusion die, where the molten stream is reduced in height and increased in width so as to provide a relatively thin and wide construction. This type of coextrusion is typically used to manufacture multilayer film constructions having about 10 layers or more.

However, the use of a feedblock is optional, as a variety of coextrusion die systems are known. For example, multimanifold dies may also be employed, such as those commercially available from The Cloeren Company (Orange, Tex.). In multimanifold dies, each material flows in its own manifold to the point of confluence. In contrast, when feedblocks are used, the materials flow in contact through a single manifold after the point of confluence. In multimanifold die manufacturing, separate streams of material in a flowable state are each split into a predetermined number of smaller or sub-streams. These smaller streams are then combined in a predetermined pattern of layers to form an array of layers of these materials in a flowable state. The layers are in intimate contact with adjacent layers in the array. This array generally comprises a stack of layers which is then compressed to reduce its height. In the multimanifold die approach, the film width remains constant during compression of the stack, while the width is expanded in the feedblock approach. In either case, a comparatively thin, wide film results. Layer multipliers in which the resulting film is split into a plurality of individual subfilms which are then stacked one upon another to increase the number of layers in the ultimate film may also be used. The multimanifold die approach is typically used in manufacturing multilayer film constructions having less than about 10 layers.

In manufacturing the films, the materials may be fed such that either the pressure sensitive material or the nonpressure sensitive material forms the outermost layers. The two outermost layers are often formed from the same material. Preferably, although not necessarily, the materials comprising the various layers are processable at the same temperature. Significantly, although it has been generally believed that the melt viscosities of the various layers should be similar, this is not a necessary requirement of the methods and products of the present invention. Accordingly, residence times and processing temperatures may have to be adjusted independently (i.e., for each type of material) depending on the characteristics of the materials of each layer. For example, compare the extruder temperatures used in Examples 5, 11, 13 and 17 in multilayer film constructions each having 61 layers.

Other manufacturing techniques, such as lamination, coating, or extrusion coating may be used in assembling multilayer films and products from such multilayer films according to the present invention. For example, in lamination, the various layers of the film are brought together under temperatures and/or pressures (e.g., using heated laminating rollers or a heated press) sufficient to adhere adjacent layers to each other.

In extrusion coating, a first layer is extruded onto either a cast web, a uniaxially oriented film, or a biaxially oriented film, and subsequent layers are sequentially coated onto the previously provided layers. Extrusion coating may be preferred over the melt coextrusion process described above if it is desirable to pretreat selected layers of the multilayer film or if the materials are not readily coextrudable.

Continuous forming methods include drawing the pressure sensitive adhesive composition out of a film die and subsequently contacting a moving plastic web or other suitable substrate. After forming, the pressure sensitive adhesive coatings are solidified by quenching using both direct methods, such as chill rolls or water baths, and indirect methods, such as air or gas impingement.

The films of the present invention can be oriented, either uniaxially (i.e., substantially in one direction) or biaxially (i.e., substantially in two directions), if so desired. Such orientation can result in improved strength properties, as evidenced by higher modulus and tensile strength. Preferably, the films are prepared by co-extruding the individual polymers to form a multilayer film and then orienting the film by stretching at a selected temperature. For example, uniaxial orientation can be accomplished by stretching a multilayer film construction in the machine direction at a temperature of about the melting point of the film, whereas biaxial orientation can be accomplished by stretching a multilayer film construction in the machine direction and the cross direction at a temperature of about the melting point of the film and at a rate of about 50% per second. Example 34, below, demonstrated that uniaxially oriented and biaxially oriented multilayer film constructions retained strength and structural stability when compared to the multilayer film construction that has not been oriented. Optionally heat-setting at a selected temperature may follow the orienting step.

EXAMPLES

This invention is further illustrated by the following examples which are not intended to limit the scope of the invention. In the examples, all parts, ratios and percentages are by weight unless otherwise indicated. The following test methods were used to characterize the pressure sensitive adhesive compositions in the examples:

Test Methods
180° Peel Adhesion Test

Multilayer film samples having a size of 1.25 centimeters (cm) wide and 15 cm long were tested for 180° peel adhesion to substrates of glass, smooth cast biaxially oriented polypropylene films, and/or stainless steel plates. The multilayer film samples were adhered to the test substrate surfaces using 4 passes of a 2.1 kilogram (kg) roller. After aging at controlled temperature and humidity conditions (approximately 22° C., 40% relative humidity) for approximately 1 hour, the tapes were tested using an Instrumentators Model 3M90 slip/peel tester, commercially available from Imass Inc., Hingham, Mass., in 180° geometry at 30.5 centimeter/minute cm/min peel rate, unless otherwise noted. Where noted, some multilayer film samples were also aged at a controlled temperature of approximately 65° C. for approximately 1 week and tested as above.

Room Temperature Shear Strength Test

Shear strength, as determined by holding time, was measured on multilayer film samples at controlled temperature and humidity conditions (approximately 22° C., 40% relative humidity). Multilayer film samples having a size of either 25.4 millimeter (mm)×25.4 mm (Method A) or 12.5 mm×12.5 mm (Method B) were adhered to a stainless steel sheet with a 2.1 kg roller using 4 passes. A 1000 gram weight was hung from the sample. The amount of time for the weight to drop was recorded. The test was stopped at 10,000 minutes.

Tensile Test

The tensile test was used to obtain stress-strain data for multilayer films. Samples of multilayer films having a size of 2.54 cm wide and a thicknesses of 51 to 127 micrometers ($\mu$m) were tested using an INSTRON Model 1122 equipped with an INSTRON Series 9 software package at a cross-head speed of 102 cm/min, both commercially available from Instron Corp., Canton, Mass. Samples were tested along the machine direction.

Dynamic Mechanical Analysis (DMA)

A Rheometrics Dynamic Analyzer RDAII, Rhesource Series (commercially available from Rheometric Scientific, Inc., Piscataway, N.J.) was used to measure the storage modulus, G', loss modulus, G", and the loss tangent delta [tan(G"/G')]. A sample of multilayer film was prepared by overlaying several layers of the multilayer film and punching out a disc having a diameter of about 8 mm and a thickness of about 2 mm. Measurements were made in a parallel plate mode, using 8 millimeter diameter plates, at a frequency of 1 Hz and a strain of 0.5%. The temperature was scanned at a rate of 5° C./minute with readings taken every 20 seconds.

Vertical Burn Test

Flame retardant nature of multilayer films were evaluated under the procedure set out in UL 510, Underwriters Laboratories, Inc. (1986).

Horizontal Burn Test

Burning characteristics of multilayer films were evaluated under the procedure set out in ASTM D1000, Flammability 104, et. seq.

Materials Used

| Material | Description |
| --- | --- |
| Acrylate PSA A | 95 weight percent isooctyl acrylate/5 weight percent acrylic acid, water emulsion polymerized, shear viscosity ~150 Pa sec, prepared according to U.S. Pat. No. RE 24,906 (Ulrich), and dried. |
| Acrylate PSA B | A suspension polymerized acrylic pressure sensitive adhesive was prepared in accordance with U.S. Pat. No. 4,833,179 (Young et al.) in the following manner: A two liter split reactor equipped with condenser, thermowell, nitrogen inlet, stainless steel motor-driven agitator, and a heating mantle with temperature control was charged with 750 grams (g) deionized water, to which was added 2.5 g zinc oxide and 0.75 g hydrophilic silica (CAB-O-SIL EH-5, available from Cabot Corp., Tuscola, IL) and was heated to 55° C. while purging with nitrogen until the zinc oxide and silica were thoroughly dispersed. At this point, a charge of 480 g isooctyl acrylate, 20 g methacrylic acid, 2.5 g initiator (VAZO 64, available from E. I. DuPont de Nemours Inc.) and 0.5 g isooctyl thioglycolate chain transfer agent were mixed together. The resulting solution with initiator and chain transfer agent was then added to the initial aqueous mixture while vigorous agitation (700 rpm) was maintained to obtain a good suspension. The reaction was continued with nitrogen purging for at least 6 hours, during which time the reaction was monitored to maintain a reaction temperature of less than 70° C. The resulting pressure sensitive adhesive was collected and dried to at least 90% solids by weight. |
| SBC PSA A | Styrene block copolymer pressure sensitive adhesive formed by melt mixing KRATON D1107 (a styrene-isoprene block copolymer commercially available from Shell Chem. Co., Houston, TX) and WINGTACK PLUS (a tackifying resin commercially available from Goodyear Tire and Rubber) in a weight ratio of 50:50 with 1 part of IRGANOX 1076 (commercially available from Ciba-Geigy Corp., Brewster, NY) per 100 parts copolymer. |
| SBC PSA B | Same as SBC PSA A except the weight ratio of KRATON D1107 to WINGTACK PLUS was 75:25. |
| SBC/SR PSA A | Styrene block copolymer/synthetic rubber pressure sensitive adhesive was formed by melt mixing KRATON D1107 (a styrene-isoprene block copolymer), NATSYN 2210 (a synthetic polyisoprene, commercially available from Goodyear Tire and Rubber, Co., Akron OH) and WINGTACK 95 (a tackifying resin) in a weight ratio of 20:30:50 with 1 part Of IRGANOX 1076 per 100 parts of the copolymer and isoprene total. |
| PAO PSA | Poly(1-octene), inherent viscosity (IV) of 2.6 dL/g, made according to U.S. Pat. No. 5,644,007, Example 5 except process variables were adjusted to make a polymer having an average IV of 2.6 dL/g instead of 2.5 dL/g. |
| SR PSA | Synthetic rubber pressure sensitive adhesive was formed by melt blending NATSYN 2210 and ESCOREZ 1310LC (a tackifier, commercially available from Exxon Chemical Co.) in a weight ratio of 50:50. |
| KRATON D1107 | Styrene-isoprene block copolymer available from Shell Chemical Co. with 1 part of IRGANOX 1076 per 100 parts copolymer. |
| KRATON G1657 | Styrene-ethylene/butylene block copolymer available from Shell Chemical Co. with 1 part of IRGANOX 1076 per 100 parts copolymer. |
| KRATON D1112 | Styrene-isoprene block copolymer available from Shell Chemical Co. with 1 part of IRGANOX 1076 per 100 parts copolymer. |
| PCTG 5445 | An amorphorphous co-polyester available from Eastman Performance Plastics, Div. of Eastman Chemical Co., Kingsport, TN. |
| PELLETHANE 2352-70A | A polyether-polyester polyurethane available from Dow Chemical Co., Midland, MI. |
| MORTHANE PE44 | A polyether polyurethane available from Morton International, Andover, MA. |
| PEBAX 5533 | A polyetheresteramide available from Elf Atochem, Philadelphia, PA. |
| ELVAX 260 | An ethylene vinyl-acetate copolymer available from E. I. DuPont de Nemours, Inc., Wilimington, DE. |
| EXACT 4023 | A metallocene catalyzed $C_2$–$C_4$ copolymer available from Exxon Chemical Co., Houston, TX. |
| STYRON 615 | A polystyrene available from Dow Chemical Co., Midland, MI. |
| DOWLEX 2517 | A linear low density polyethylene available from Dow Chemical Co., Midland, MI. |
| ELVAX 250 | An ethylene vinyl-acetate copolymer available from E. I. DuPont de Nemours, Inc., Wilmington, DE. |
| 1 Nat-2P-W | A flame retardant polyethylene concentrate containing an antimony based flame retardant, available from M. A. Hanna, Elk Grove Village, IL. |
| ESCORENE 1024 | A Ziegler-Natta catalyzed isotactic polypropylene homopolymer available from Exxon Chemical Co., Houston, TX. |
| ENGAGE 8200 | A metallocene polymerized olefin, containing 24% octene comonomer available from Dow Chemical Co., Midland, MI. |

-continued

Materials Used

| Material | Description |
|---|---|
| NATSYN 2210 | A synthetic polyisoprenes available from Goodyear Tire and Rubber Co., Akron, OH. |
| EASTAR 6763 | An amorphous polyester available from Eastman Chemical Co., Kingsport, TN. |
| VM100 | A polymethylmethacrylate available from Rohm and Haas, Philadelphia, PA. |

Examples 1–4, Comparative Example A

Examples 1–4 were multilayer films having 5 layers of an $A(BA)_1BA$ construction. They were prepared to illustrate the effect of the concentration and modulus of the material in the nonpressure sensitive adhesive "B" layer on pressure sensitive adhesive properties.

In Example 1, Acrylate PSA A was fed by a single screw extruder (BERLYN, 51 mm), having an L/D of 30/1, commercially available from Berlyn Corp., Worchester, Mass., operating with zone temperatures increasing from 74° C. to 166° C. into the outer two A channels of a five layer feedblock (CLOERON Model 86-120-400, commercially available from Cloeron Co., Orange, Tex.) and by a twin screw extruder (LEISTRITZ Model LSM 34 GL, 34 mm, having an L/D of 42/1, commercially available from Liestritz Corp., Sommerville, N.J.) operating with zone temperatures increasing from 73° C. to 166° C. into the middle A channel. Materials for forming a "B" layer (KRATON D1107, with 1 part IRGANOX 1076 per 100 parts polymer) were fed by a single screw extruder (KILLION Model KTS-125, 32 mm, having an L/D of 24/1, commercially available from Killion, Inc., Cedar Grove, N.J.) operating with zone temperatures increasing from 127° C. to 216° C. into the two B channels of a five layer feedblock (CLOERON Model 86-120-400). The streams were merged in the feedblock into a multilayered flow stream that was passed through a single orifice film die and drop cast onto and laminated to a polyethylene terephthalate film having a thickness of 51 micrometer release liner and passed over a chill roll to form a multilayer film on a single layer film. The temperatures of the feedblock, die and chill roll were set at 177° C., 182° C. and 21° C., respectively, and the line speed was 10.7 meters/minute (m/min.). The multilayer film had an overall measured thickness of 81 micrometers and a calculated weight ratio of A:B of 60:40.

Examples 2, 3 and 4 were made substantially as in Example 1, except the KRATON D1107 was replaced with other "B" materials as follows: Example 2—KRATON G1657; Example 3—KRATON D1112; and Example 4—KRATON D1112.

Comparative Example A was made in a manner similar to Example 1 except that no material was fed into the two B channels and the process conditions were adjusted to result in an overall thickness of 71 micrometers, wherein the multilayer film had 3 layers.

Examples 1–4 and Comparative Example A were tested for 180° peel adhesion to glass and room temperature shear strength and the results are shown in Table 1.

TABLE 1

| Example | A:B Weight Ratio | Thickness (µm) | Peel to glass (N/dm) | Shear-RT (min.) |
|---|---|---|---|---|
| Comp. Ex. A (3 layers) | 100:0 | 71 | 55 | 130 |
| 1 (5 layers) | 60:40 | 81 | 42 | 155 |
| 2 (5 layers) | 60:40 | 71 | 25 | 120 |
| 3 (5 layers) | 60:40 | 61 | 43 | 119 |
| 4 (5 layers) | 88:12 | 69 | 46 | 110 |

The data in Table 1 indicates that peel adhesion decreased and the shear strength remained substantially constant as the modulus of the B component increased (e.g., compare Example 1 versus Example 2). Peel adhesions appeared to be independent of the amount of B in the overall multilayer film construction (e.g., compare Example 3 versus Example 4).

Examples 5–6, Comparative Example B

Examples 5 and 6 were multilayer films having 61 layers of a construction $A(BA)_{29}BA$. They were prepared to illustrate the effect the presence of a nonpressure sensitive adhesive material on the ability to form relatively thin multilayer films including pressure sensitive adhesive materials.

Examples 5 and 6 were made in a similar manner as Example 1 except a different feedblock was used and a twin screw extruder was used to feed the material into the A layers. No single screw extruder was used to feed the material into the A layers. A feedblock made as in U.S. Pat. No. 4,908,278 (Bland et al.) was used that allowed two flow streams to be fed into 61 slots in an alternating manner and come together in a multilayer flow stream having layers arranged as $A(BA)_{29}BA$. The temperatures of the feedblock and the die were set at 193° C. and 193° C., respectively The overall thickness was varied by changing the line speed from 13.4 m/min for Example 5 to 22.9 m/min for Example 6. Comparative Example B was the same as Comparative Example A.

Examples 5–6 and Comparative Example B were tested for peel 180° peel adhesion to glass and room temperature shear strength. The results as well as the A:B ratio and multilayer film thickness for Examples 5–6 and Comparative Example B are shown in Table 2.

TABLE 2

| Example | A:B Ratio | Thickness (µm) | Peel to glass (N/dm) | Shear-RT (min.) |
|---|---|---|---|---|
| Comp. Ex. B (3 layers) | 100:0 | 71 | 55 | 130 |
| 5 (61 layers) | 72:28 | 51 | 56 | 95 |
| 6 (61 layers) | 72:28 | 25 | 51 | 46 |

Surprisingly, the peel adhesion of the multilayer film construction remained similar at thinner constructions than possible with 3 layer constructions having no B layers. The pressure sensitive adhesive material in Comparative Example B, similar to Comparative Example A, could not be drawn down to a continuous layer having a thickness of 25 micrometers, illustrating the processing advantages (e.g., thinner multilayer films, higher processing rates) by including layers formed from nonpressure sensitive adhesive materials with layers formed from pressure sensitive adhesive materials.

Examples 7–10, Comparative Example C

Examples 7–10 were multilayer films having 61 layers of a construction $A(BA)_{29}BA$. They were prepared to illustrate the effect of affinity between A and B materials on pressure sensitive adhesive properties.

Example 7, 8, 9, and 10 were made in a similar manner as Example 5 except different materials were used in the B layers as follows: Example 7—KRATON D1107; Example 8—KRATON G1901X; Example 9—PCTG 5445; and Example 10—PELLETHANE 2352-70A. Different process conditions (shown in Table 3A below) resulted in various weight ratios of A:B and the overall thickness of Examples 7–10 are shown in Table 3 below. Comparative Example C was the same as Comparative Example A.

TABLE 3A

| Example | Single Screw Extruder Temp. (° C.) | Twin Screw Extruder Temp. (° C.) | Line Speed (meters per minute) | Die Temp. (° C.) | Feedblock Temp. (° C.) |
| --- | --- | --- | --- | --- | --- |
| Comp. Ex. C (3 layers) | 73–166 | 66–166 | 6 | 177 | 177 |
| 7 (61 layers) | 127–193 | 66–177 | 11 | 193 | 193 |
| 8 (61 layers) | 138–243 | 66–166 | 12 | 177 | 177 |
| 9 (61 layers) | 182–210 | 66–177 | 12 | 177 | 177 |
| 10 (61 layers) | 151–232 | 66–166 | 12 | 160 | 160 |

Examples and Comparative Example C were tested for peel 180° peel adhesion to glass and room temperature shear strength. The data is shown in Table 3.

TABLE 3

| Example | A:B Weight Ratio | Thickness (µm) | Peel to glass (N/dm) | Shear-RT (min.) |
| --- | --- | --- | --- | --- |
| Comp. Ex. C (3 layers) | 100:0 | 71 | 55 | 130 |
| 7 (61 layers) | 50:50 | 76 | 55 | 103 |
| 8 (61 layers) | 80:20 | 64 | 42 | 173 |
| 9 (61 layers) | 89:11 | 71 | 35 | 218 |
| 10 (61 layers) | 73:27 | 51 | 56 | 253 |

The types of interfacial interactions demonstrated between the A and B layers were: immiscible-none (Example 7), acid—acid (Example 8), acid—acid ester (Example 9), and acid-urea (Example 10). As the affinity for the material in the B layers and the A layers increased, the shear strength also increased.

Examples 11–12, Comparative Example D

Examples 11 and 12 were multilayer films having 61 layers of a construction $A(BA)_{29}BA$. They were prepared to illustrate the effect of affinity between A and B materials with a different pressure sensitive adhesive (or "A") material on pressure sensitive adhesive properties of multilayer films.

Example 11 was made in a similar manner as Example 5 except different materials in both the A and B layers were as follows: Layer A—Acrylate PSA B and Layer B—MORTHANE PE44-203. Different process conditions were used in that the temperatures of the LEISTRITZ twin screw extruder and the KILLION single screw extruder were set to increase from 65° C. to 177° C. and 160° C. to 193° C., respectively. The weight ratio of A:B was calculated to be 91:9, and the over thickness was measured at 61 micrometers and the line speed was 10.7 m/min.

Example 12 was made in as in Example 11 except PEBAX 5533 was used in the B layers.

Comparative Example D was made in the same manner as Comparative Example A except the Acrylate PSA B was used instead of Acrylate PSA A, the die block was the 61 slot feedblock of Example 5 and the overall thickness was 61 micrometers.

Examples 11–12 and Comparative Example D were tested for peel 180° peel adhesion to glass and room temperature shear strength. The results as well as the A:B weight ratio and film thickness are shown in Table 4.

TABLE 4

| Example | A:B Weight Ratio | Thickness (µm) | Peel to glass (N/dm) | Shear-RT (min.) |
| --- | --- | --- | --- | --- |
| Comp. Ex. D (31 layers) | 100:0 | 61 | 43 | 282 |
| 11 (61 layers) | 91:9 | 61 | 38 | 452 |
| 12 (61 layers) | 91:9 | 61 | 42 | 424 |

The data indicates that the shear strength increased without a significant loss in adhesion when stiffer B materials were used that had an affinity for the acrylate pressure sensitive adhesive material.

Example 13, Comparative Example E

Example 13 was a multilayer film having 61 layers of a construction $A(BA)_{29}BA$. It was prepared by irradiating at two different radiation levels to illustrate the effect of ultraviolet light irradiation on pressure sensitive adhesive properties of multilayer films.

Example 13 was made in a similar manner as Example 5 except different materials in both the A and B layers were used. Acryloxybenzophenone in an amount of 0.3 part per 100 parts of pressure sensitive adhesive was added to the material for the A layers and ELVAX 260 was used in place of KRATON D1107 for the B layers. Different process conditions were used in that the temperatures of the LEISTRITZ twin screw extruder and the KILLION single screw extruder were set to increase from 66° C. to 177° C. and 131° C. to 155° C., respectively, and the temperatures of the feedblock, die, and chill roll were set at 199° C., 199° C., and 11° C., respectively. The ratio of A:B was calculated to be 87:13, and the total thickness was measured at 51 micrometers and the line speed was 10.7 m/min.

Examples 13A and 13B were then made irradiating each with ultraviolet irradiation using a UV Processor Model #QC120244ANIR available from RPC Industries, Inc., Hayward, Calif., with medium mercury lamps. The irradiation was performed in an inert nitrogen atmosphere at a calibrated dose at 365 nm of 20 mJ/cm$^2$ and 50 mJ/cm$^2$ for Examples 13A and 13B, respectively. Comparative Example E was the same as Comparative Example A.

The examples were tested for 180° peel adhesion to glass and room temperature shear strength. The weight A:B ratio, overall film thickness, and test results for Examples 13, 13A, 13B and Comparative Example E are shown in Table 5.

TABLE 5

| Example | A:B Weight Ratio | Thickness ($\mu$m) | Peel to glass (N/dm) | Shear-RT (min.) |
|---|---|---|---|---|
| Comp. Ex. E (3 layers) | 100:0 | 71 | 55 | 130 |
| 13 (61 layers) | 87:13 | 51 | 50 | 320 |
| 13A (61 layers) | 87:13 | 51 | 23 | 10,000+ |
| 13B (61 layers) | 87:13 | 51 | 20 | 10,000+ |

The data indicates that shear strengths for multilayer pressure sensitive adhesive film constructions were increased by additional crosslinking, as shown by Examples 13A and 13B, as compared to Example 13 which did not have any crosslinking. No significant differences were seen between Examples 13A and 13B.

Examples 14–16, Comparative Example F

Examples 14–16 were multilayer films having 5 layers of a construction A(BA)$_1$BA. They were prepared to illustrate the effect of the concentration or modulus of the material in the B layer on pressure sensitive adhesive properties when a pressure sensitive adhesive was used that has higher inherent shear strength.

Example 14 was made in a similar manner as Example 1 except different materials were used in both the A and B layers. SBC PSA A was melt mixed in the LEISTRITZ twin screw extruder and the output was split and fed into all three A channels of the feedblock. No single screw extruder was used to feed the material into the A layers. EXACT 4023 was used in place of KRATON D1107 as the B layer material. Different process conditions were used in that the temperature of the LEISTRITZ twin screw extruder was set to increase from 149° C. to 207° C. to mix the components into a pressure sensitive adhesive, and then to decrease to 173° C. to convey the mixed pressure sensitive adhesive. The temperature of the KILLION single screw extruder was set to increase from 149° C. to 216° C. The weight ratio of A:B was calculated to be 77:23, the over thickness was measured at 51 micrometers and the line speed was 13.1 m/min.

Example 15 was made as in Example 14 except the flow rates of A and B were adjusted to result in a weight ratio of A:B of 50:50.

Example 16 was made as in Example 14 except STYRON 615 was used in place of EXACT 4023 as the B layer and flow rates of A and B were adjusted to result in a weight ratio of A:B of 80:20.

Comparative Example F was made in the same manner as Comparative Example A except SBC PSA A was used instead of Acrylate PSA A and the overall thickness was 51 micrometers.

Examples 14–16 and Comparative Example F were tested for 180° peel adhesion to glass and room temperature shear strength. The A:B weight ratio, overall film thickness, and test results are shown in Table 6.

TABLE 6

| Example | A:B Weight Ratio | Thickness ($\mu$m) | Peel to glass (N/dm) | Shear-RT (min.) |
|---|---|---|---|---|
| Comp. Ex. F (3 layers) | 100:0 | 53 | 113 | 10,000+ |
| 14 (5 layers) | 77:23 | 51 | 104 | 10,000+ |
| 15 (5 layers) | 50:50 | 51 | 84 | 9024 |
| 16 (5 layers) | 80:20 | 51 | 72 | 10,000+ |

The data indicates that when the A layer is made of a styrene block copolymer pressure sensitive adhesive, the peel adhesion can be controlled by varying either the amount of the B component (Examples 14 versus Example 15) or the stiffness of the B component (Example 16).

Examples 17–22, Comparative Example G

Examples 17–22 were multilayer films having 61 layers of a construction A(BA)$_{29}$BA. They were prepared to illustrate the effect of the modulus of the material in the B layer and the number of layers on pressure sensitive adhesive properties.

Example 17 was made in a similar manner as Example 5 except different materials in both the A and B layers and different process conditions were used as follows. SBC PSA A, instead of Acrylate PSA A, was melt mixed in the LEISTRITZ twin screw extruder and the output was fed into the A slots of the feedblock. DOWLEX 2517 was used in place of KRATON D1107 and fed into the B slots. The temperature of the LEISTRITZ twin screw extruder was set to increase from 149° C. to 193° C. to mix the components into a pressure sensitive adhesive, and then to decrease to 155° C. to convey the mixed pressure sensitive adhesive. The temperature of the KILLION single screw extruder was set to increase from 139° C. to 216° C. The temperatures of the feedblock, die, and chill roll were set at 199° C., 199° C., and 11° C., respectively. The weight ratio of A:B was calculated to be 87:13, the overall thickness was measured at 51 micrometers and the line speed was 20.7 m/min.

Examples 18, 19, 20, and 22 were made in a similar manner as Example 17 except the material in the B layer was as follows: Example 18—DOWLEX 2517; Example 19—EXACT 4023; Example 20—EXACT 4023; and Example 22—ELVAX 250. The processing conditions are shown in Table 7A below. The weight ratios of A:B and overall thickness of the constructions are listed in Table 7, below.

Example 21 had 5 layers and was made similar to Example 14 except the material of the B layer was DOWLEX 2517 and the weight ratio of A:B was as in Example 18.

Comparative Example G was made in a similar manner as Comparative Example D except SBC PSA A was used instead of Acrylate PSA B and the overall thickness was 53 micrometers.

TABLE 7A

| Example | Single Screw Extruder Temp. (° C.) | Twin Screw Extruder Temp. (° C.) | Line Speed (meters per minute) | Die Temp. (° C.) | Feedblock Temp. (° C.) |
|---|---|---|---|---|---|
| Comp. Ex. G (31 layers) | — | 32–156 | 15 | 154 | 154 |
| 17 (61 layers) | 139–221 | 32–155 | 21 | 154 | 154 |
| 18 (61 layers) | 139–221 | 32–155 | 24 | 154 | 154 |
| 19 (61 layers) | 138–171 | 32–154 | 19 | 154 | 154 |
| 20 (61 layers) | 138–171 | 32–154 | 20 | 154 | 154 |
| 21 (5 layers) | 147–216 | 34–174 | 14 | 350 | 177 |
| 22 (61 layers) | 138–216 | 32–155 | 24 | 330 | 154 |

Examples 17–22 and Comparative Example G were tested for 180° peel adhesion to glass and room temperature shear strength. The A:B weight ratio, overall film thickness and test results are shown in Table 7.

TABLE 7

| Example | A:B Weight Ratio | Thickness (μm) | Peel to glass (N/dm) | Shear-RT (min.) |
|---|---|---|---|---|
| Comp. Ex. G (31 layers) | 100:0 | 53 | 154 | 10,000+ |
| 17 (61 layers) | 87:13 | 51 | 101 | 10,000+ |
| 18 (61 layers) | 71:29 | 51 | 97 | 10,000+ |
| 19 (61 layers) | 95:5 | 48 | 135 | 10,000+ |
| 20 (61 layers) | 87:13 | 51 | 122 | 10,000+ |
| 21 (61 layers) | 71:29 | 51 | delam | 645 |
| 22 (61 layers) | 71:29 | 51 | 70 | 10,000+ |

The data indicates that peel adhesion decreased with a stiffer B material (e.g., Example 17 versus Comparative Example G) and increased with a softer B material (e.g., Example 17 versus Example 20). In addition, the tendency for these materials to delaminate, or fail cohesively, was decreased with more layers (e.g., Example 18 versus Example 21).

Examples 17 and 18 and Comparative Example G were aged at 65° C. for 3 days and tested for 180° peel adhesion to glass. The test results are reported below in Table 8 together with the unaged test results and the percent change.

TABLE 8

| Example | Peel to glass (N/dm) | Aged peel to glass (N/dm) | Percent change |
|---|---|---|---|
| Comp. Ex. G | 154 | 123 | −21 |
| 17 | 101 | 111 | +10 |
| 18 | 97 | 107 | +10 |

The data indicates that the multilayer films of Examples 17 and 18 aged better than Comparative Example G that did not contain a B layer.

Examples 23–25, Comparative Example H

Examples 23–25 were multilayer films having 13 layers of a construction $A(BA)_5BA$. They were prepared to illustrate the effect of using various amounts of a flame retardant material as a B layer on overall flame retardant properties.

Example 23 was made in a similar manner as Example 5. SBC/SR PSA A, instead of Acrylate PSA A, was first melt mixed in the LEISTRITZ twin screw extruder and conveyed in the BERLYN single screw extruder to the A slots of a feedblock of Example 5 having 13 slots. A flame retardant polyethylene concentrate, 1 Nat-2P-W, was used in place of KRATON D1107 in the KILLION single screw extruder and fed into the B slots. Different conditions were used in that the temperature of the BERLYN single screw extruder was set to increase to about 154° C. The temperatures of the feedblock, die and chill roll were set at 171° C., 171° C., and 16° C., respectively. The line speed was 21 m/min., the volumetric ratio of A:B was calculated to be 85:15 and the overall thickness was measured at 38 micrometers. The multilayer sheeting was laminated to a 50 micrometer sheet of polyethylene terephthalate film.

Examples 24 and 25 were made in a similar manner as Example 23, except the flow rates of the materials were adjusted to obtain calculated volumetric ratios of A:B of 67:33 and 62:38, for Examples 24 and 25 respectively.

Comparative Example H was made in a similar manner as in Example 23, except no flame retardant polyethylene concentrate was fed into the B slots. Thus, Comparative Example H contained 1 layer formed from SBC/SR PSA A and did not include a B layer material.

Examples 23–25 and Comparative Example H were tested for flamability under ASTM D 1000 (a horizontal burn test) and UL 510 (a vertical burn test). The test results and the A:B volumetric ratio of Examples 23–25 and Comparative Example H are shown in Table 9.

TABLE 9

| Example | A:B Volumetric Ratio | Horizontal Burn (seconds) | Vertical Burn (seconds) | Adhesion To Steel (N/dm/25 μm) |
|---|---|---|---|---|
| Comp. Ex. H. (1 layers) | 100:0 | Complete burn | >120 | 47 |
| 23 (13 layers) | 85:15 | 28 | 63 | 24 |
| 24 (13 layers) | 67:33 | 45 | 14 | 5.4 |
| 25 (13 layers) | 62:38 | 13 | 15 | 1.0 |

The multilayer film constructions (Examples 23–25) that contained flame retardant materials in the B layers imparted a resistance to flame on the entire multilayer film construction even though the materials in the A layers were themselves quite flammable. Surprisingly, a flame retardant pressure sensitive adhesive multilayer film can be produced which contains a low volume percent of a flame retardant but which has high adhesion to steel. These flame retardant pressure sensitive adhesive multilayer film constructions minimize flame retardant blooming to the adhesive layer surface by concentrating the flame retardant in the internal layers of the pressure sensitive adhesive multilayer film constructions.

Examples 26–28, Comparative Examples I and J

Examples 26–28 were multilayer films having 29 layers of a construction $A(BA)_{13}BA$. Example 26 was made in a similar manner as Example 5. The materials of the A layer was PAO PSA, which was conveyed in a single screw extruder (BONNOT Extruder Packer, 51 mm, having an L/D of 10/1, commercially available from Bonnot Corp., Uniontown, Ohio) to the A slots of a feedblock of Example 5 having 29 slots. No twin screw extruder was used because the PAO PSA does not require mixing. The B layer material was a nonpressure sensitive adhesive, ESCORENE 1024, and was used in the KILLION single screw extruder and fed into the "B" slots. The temperature of the BONNOT and the KILLION single screw extruders were both set to increase to about 193° C. The temperatures of the feedblock, die, and chill roll were set at 193° C., 193° C., and 21° C., respectively. The line speed was 12 m/min., the volumetric ratio of A:B was calculated to be 80:20 and the overall thickness was measured at about 81 micrometers.

Example 27 was made in a similar manner as Example 26, except the flow rates of the materials were adjusted, as shown in Table 10, to obtain a calculated volumetric ratio of A:B of 90:10 and an overall thickness of about 64 micrometers.

Example 28 was made in a similar manner as Example 26. The material of the A layer was SR PSA A, which was first melt mixed in a twin screw extruder (model ZSK-30, commercially available from Werner and Pfleiderer Corp., Ramsey, N.J., 30 mm, having an L/D of 36/1) and conveyed in the BONNOT single screw extruder to the A slots of the feedblock. The material of the B layer was ENGAGE 8200, which was fed into the B slots using the KILLION single screw extruder. The temperatures of the ZSK-30 twin screw extruder and the KILLION single screw extruder were set to increase to about 204° C. and 182° C., respectively. The overall thickness was measured at about 99 micrometers.

Comparative Examples I and J were made in a similar manner as in Example 26 and 28, respectively, but did not contain the B layer nonpressure sensitive adhesive material. The overall thickness was 53 micrometers for Comparative Example I and 61 micrometers for Comparative Example J, wherein Comparative Examples I and J have 1 layer.

Examples 26–28 and Comparative Examples I and J were tested for room temperature shear strength and 180° peel adhesion to both polypropylene (designated "PP") and glass. The results, multilayer film thicknesses, and A:B volumetric ratios are shown in Table 10.

TABLE 10

| Example | A:B Volumetric Ratio (flow rates of A - B in lb/hr) | Thickness (μm) | Peel to PP (N/dm/mil) | Peel to glass (N/dm/mil) | Shear-RT (min.) |
|---|---|---|---|---|---|
| 26 (29 layers) | 80:20 16 - 4 | 81 | 19 | 8.2 | 60 |
| 27 (29 layers) | 90:10 18 - 2 | 64 | 14 | 5.3 | 32 |
| Comp. Ex. I (1 layer) | 100:0 20 - 0 | 53 | 12 | 15 | 8 |
| 28 (29 layers) | 80:20 16 - 4 | 99 | 26 | 30 | 31 |
| Comp. Ex. J (1 layer) | 100:0 20 - 0 | 61 | 39 | 39 | 8 |

The peel values have been normalized to 1 mil, wherein 1 mil is equivalent to 0.001 inch which is equivalent to 25.4 micrometers. The data indicates that the multilayer films can be made with other classes of pressure sensitive adhesives in the A layer, as shown by Examples 26–28.

Examples 29–32, Comparative Examples K and L

A multilayer film construction may also be formed from layers of different pressure sensitive adhesive materials rather than pressure sensitive adhesive and nonpressure sensitive adhesive materials. Examples 29–32 and Comparative Examples K and L were prepared to illustrate the use of different types of pressure sensitive adhesive materials used in a multilayer film construction.

Example 29 was prepared in a manner similar as Example 5. The components of SBC PSA A were melt mixed in a LEISTRITZ twin screw extruder and conveyed into the A slots of a 13 slot feedblock as used in Examples 23–25. Acrylate PSA A was conveyed in a BERLYN single screw extruder to the A' slots. The temperature of the LEISTRITZ twin screw extruder and the BERLYN single screw extruder were both up to 177° C. The temperature of the feedblock, die, and chill roll were 177° C., 177° C. and 27° C., respectively. The flow rates were adjusted to 10 lb/hr of SBC PSA A and 12.8 lb/hr of Acrylate PSA A to result in a calculated weight ratio of A:A' of 44:56 and a an overall thickness of 38 micrometers. The line speed was about 14 meters/min.

Example 30 was prepared in a similar manner as Example 29, except that SBC PSA A was conveyed with a KILLION single screw extruder fitted with a mixing section into the A' slots and Acrylate PSA A was conveyed into the A slots. The temperatures of the BERLYN and KILLION single screw extruders were 204° C. and 160° C., respectively. The flow rates were adjusted to 3 lb/hr of Acrylate PSA A and 34.3 lb/hr of SBC PSA A to result in a calculated weight ratio of A:B of 8:92 and an overall thickness of 84 micrometers.

Example 31 was prepared in a similar manner as Example 30, except that SBC PSA A was conveyed with a KILLION single screw extruder fitted with a mixing section into the A slots of a feedblock having 29 slots as in Examples 26–28. The temperatures of the KILLION and the BERLYN single screw extruders were 177° C. and 193° C., respectively. The flow rates were adjusted to 24.1 lb/hr SBC PSA A and 17.1 lb/hr Acrylate PSA A to result in a calculated weight ratio of A:B of 58:42 and an overall thickness of 51 micrometers. The line speed was about 22.9 meters/min. The flow rates were sufficient to fill all of the slots and result in a multilayer film having 29 layers.

Example 32 was prepared in a manner similar as Example 31 except SBC PSA B was used to make the A layers.

Comparative Example K was made in a similar manner as Example 29 except no Acrylate PSA A was fed into the A' slots and the overall thickness was 43 micrometers. Comparative Example L was made in a similar manner as Example 29 except no SBC PSA A was fed into the A slots and the overall thickness was 33 micrometers.

Examples 29–32 and Comparative Examples K and L were tested for 180° peel adhesion to both polypropylene (PP) and stainless steel. The results, example thickness, and A:B Ratio are shown in Table 11.

TABLE 11

| Example | A:A' Weight Ratio | Thickness (μm) | Adhesion to PP (N/dm/25 μm) | Adhesion to Steel (N/dm/25 μm) |
|---|---|---|---|---|
| 29 (13 layers) | 44:56 | 38 | 37 | 43 |
| 30 (13 layers) | 8:92 | 84 | 24 | 28 |
| 31 (29 layers) | 58:42 | 51 | 22 | 26 |
| 32 (29 layers) | 58:42 | 51 | 14 | 22 |
| Comp. Ex. K (7 layers) | 100:0 | 43 | 46 | 57 |
| Comp. Ex. L (6 layers) | 0:100 | 33 | 19 | 28 |

As shown in Example 29–30, the materials in the layers can be interchanged, i.e., material having higher melt viscosity (e.g., at 100 sec$^{-1}$, the viscosity of Acrylate PSA A is about 100 Pa sec. and the viscosity of SBC PSA A is about 250 Pa sec.) can be used for either the A layers or the A' layers.

Examples 33–34, Comparative Example M

Examples 33 and 34 were multilayer films of a construction A(BA)$_n$BA. They were prepared to illustrate the effect of number of layers on the film properties.

Example 33 was made in a similar manner as Example 5. EASTAR 6763 was used instead of KRATON D1107 in the B layer and was and fed into the B slots of a feedblock having 13 slots as described in Example 23. The temperatures of the LEISTRITZ twin screw extruder and the KILLION single screw extruder were set to increase from 66° C. to 166° C. and from 82° C. to 216° C., respectively. The temperatures of the feedblock, die, and chill roll were set at 177° C., 177° C., and 11° C., respectively. The line speed was 3.6 m/min., the weight ratio of A:B was calculated to be 81:19 and the overall thickness was measured to be 150 micrometers, wherein the multilayer film had 13 layers.

Example 34 was made in a similar manner as Example 33 using the 61 slot feedblock of Example 5, except that the temperature of the KILLION single screw extruder was set to increase from 151° C. to 233° C. The temperatures of the feedblock, die, and chill roll were set at 159° C., 160° C., and 11° C., respectively. The line speed was 5.1 m/min., wherein the multilayer film had 61 layers.

Comparative Example M was made in a similar manner as Comparative Example A except it was an ABA construction with EASTAR 6763 being fed into the middle vane instead of Acrylate PSA A and the construction had an overall thickness of 118 micrometers and an A:B ratio of 81:19.

Examples 33–34 and Comparative Example M were tested for tensile properties to determine the yield stress, break stress and elongation. The number of layers, overall film thickness and test results are shown in Table 12.

TABLE 12

| Example | A:B Weight Ratio | Thickness (μm) | Yield Stress (Mpa) | Break Stress (Mpa) | Elongation (%) |
|---|---|---|---|---|---|
| Comp. Ex. M (3 layers) | 100:0 | 118 | 9.4 | 3.5 | 38 |
| 33 (13 layers) | 81:19 | 152 | 9.6 | 5.5 | 220 |
| 34 (61 layers) | 82:18 | 152 | 6.3 | 6.6 | 310 |

Figure 2:
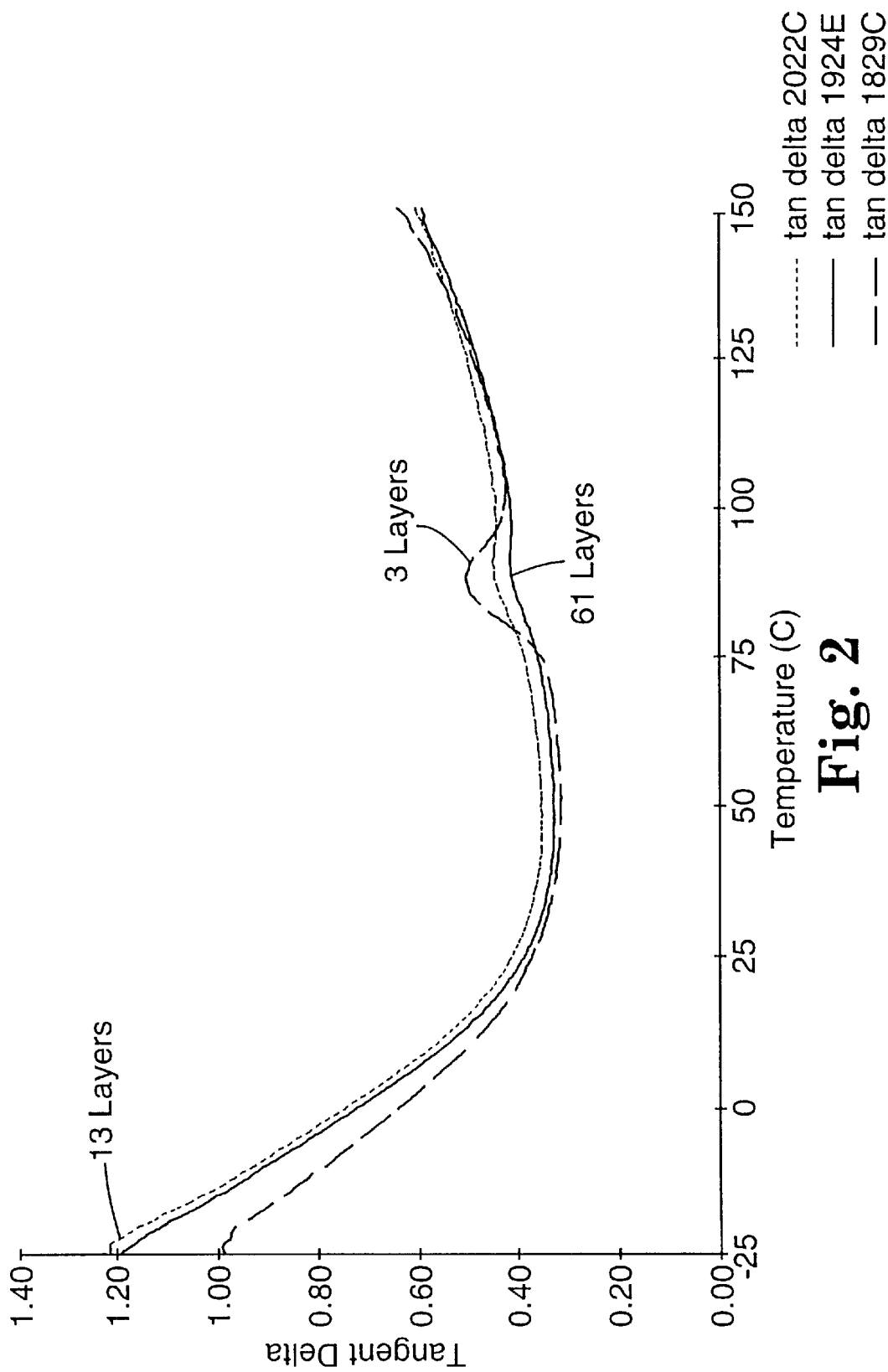
FIG. 2 is a graph of the DMA spectrum for multilayer constructions of alternating layers of an acrylate pressure sensitive adhesive and an amorphous polyester having similar compositions and having 3, 13, and 61 layers as exemplified in Comparative Example M and Examples 33–34, respectively.

The data indicates that multilayer films of Examples 33 and 34 had increased elongation at break and toughness. This is graphically depicted in FIG. 1 where the toughness is defined by the area under the stress-strain curves. Additionally, comparison of the DMA spectrum is graphically depicted in FIG. 2. As the thickness of the individual layers decreases (i.e., the number of layers increases for the same overall multilayer film thickness), the presence of the glass transition response of the amorphous polyester at 87° C. is substantially decreased.

The pressure sensitive layer on each surface of a sample of Example 34 was washed with isopropyl alcohol until the surface was not tacky to the touch. The structure and strength of the multilayer films having 59 layers were substantially the same as before the two layers were washed off.

The effects of orientation were also evaluated. Two samples of the multilayer film of Example 34 were pressed together by hand to form a construction having 122 layers. Several samples of the 122 layer construction, having a size of 61 cm long by 10 cm wide) were uniaxially oriented 4 to 1 at 100° C. Three samples of the multilayer film of Example 34 were pressed together to form a construction having 183 layers. Several samples of the 183 layer construction, having a length and width of 8 cm) were simultaneously biaxially oriented 3×3 at 100° C. at a rate of 50% per second. Both the 122 layer construction and the 183 layer construction retained their strength and structural stability.

Figure 3:
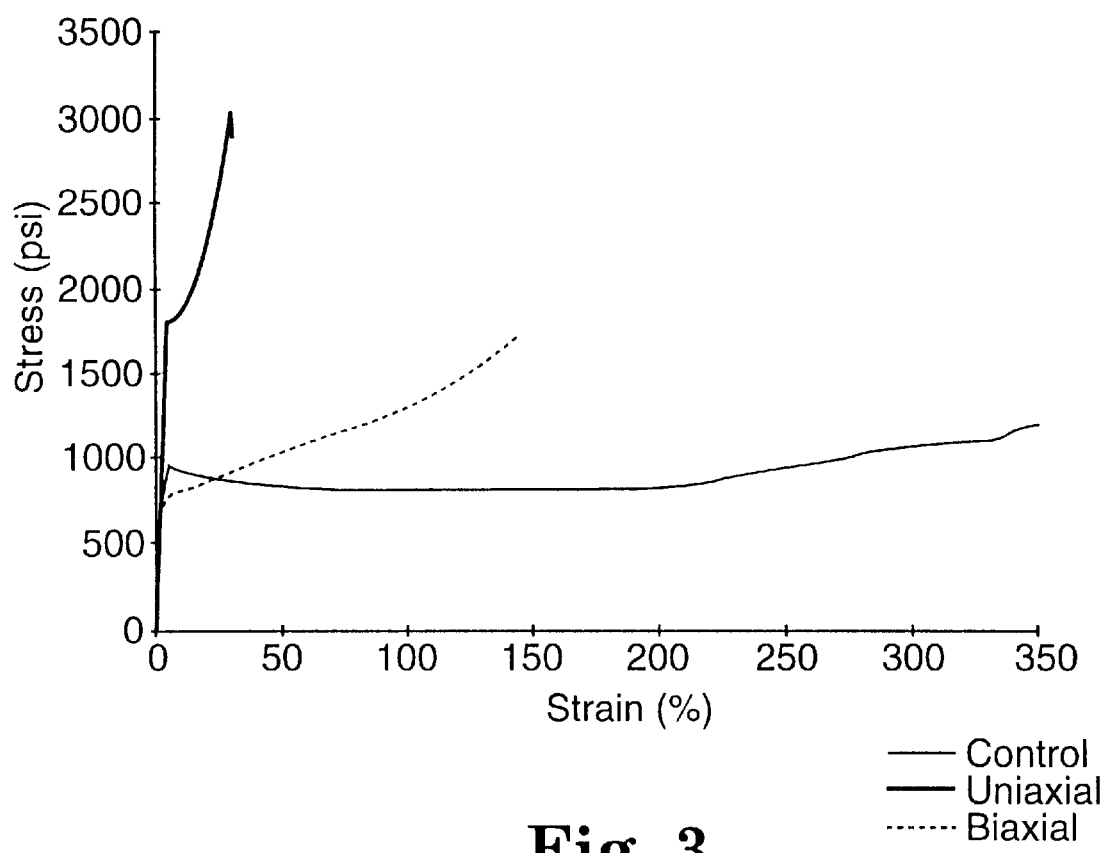
FIG. 3 is a graph of stress versus strain for multilayer constructions that have been oriented in one direction (uniaxially) and two directions (biaxially) as exemplified in Example 34.

The tensile properties of the 59, 122, and 183 layer constructions were analyzed with a linear gauge that measured load as a function of the length stretched. The samples tested had a size of 2.5 cm with a gauge length of 10.16 cm. The results are shown in FIG. 3, wherein the multilayer films are identified as control, uniaxial, and biaxial, respectively. The results are depicted as stress (psi) versus strain (%), which shows that the break stress of the uniaxially oriented sample increased 3 times relative to the control, and the break stress of the biaxially oriented sample increased 1.5 times relative to the control.

Examples 35–38

Examples 35–38 were multilayer films having a construction of A(BA)$_n$BA. They were prepared to illustrate the effect of composition of the B layer at various layer numbers on the film properties.

Example 35 was made in a similar manner as Example 14 except STYRON 615 was used in place of EXACT 4023, the line speed was 11 m/min. and the weight ratio of A:B was calculated to be 80:20, wherein the multilayer film had 5 layers.

Example 36 was made in a similar manner as Example 35 using the 13 slot feedblock of Example 33, however, the temperature of the KILLION single screw extruder was set to increase from 188° C. to 260° C. The line speed was 5.1 m/min., the weight ratio of A:B was calculated to be 86:14, and the overall thickness was 250 micrometers, wherein the multilayer film had 13 layers.

Example 37 was made in a similar manner as Example 33 except VM100 was used in place of EASTAR 6763, the line speed was 4.6 m/min., the weight ratio of A:B was calculated to be 75:25, and the overall thickness was 225 micrometers, wherein the multilayer film had 13 layers.

Example 38 was made in a similar manner as Example 17 except STYRON 615 was used in place of DOWLEX 2517. The temperature of the KILLION twin screw extruder was set to increase from 121° C. to 204° C. and then to decrease to 149° C. The temperature of the LEISTRITZ single screw extruder was set to increase from 182° C. to 271° C. The temperatures of the feedblock, die, and chill roll were 182° C., 174° C. and 22° C., respectively. The weight ratio of A:B was calculated to be 40:60 and the overall thickness was 200 micrometers, wherein the multilayer film had 61 layers.

Examples 35–38 were tested for tensile properties to determine the yield stress, break stress, and elongation. The A:B weight ratio, overall film thickness, and test results are shown in Table 13.

TABLE 13

| Example | A:B Weight Ratio | Thickness ($\mu$m) | Yield Stress (Mpa) | Break Stress (Mpa) | Elongation (%) |
|---|---|---|---|---|---|
| 35 (5 layers) | 80:20 | 51 | 5.5 | 2.3 | 12 |
| 36 (13 layers) | 86:14 | 152 | 16.3 | 15.6 | 7 |
| 37 (13 layers) | 75:25 | 127 | 13.1 | 14.7 | 8 |
| 38 (61 layers) | 40:60 | 102 | 15.4 | 15.4 | 8 |

Figure 4:
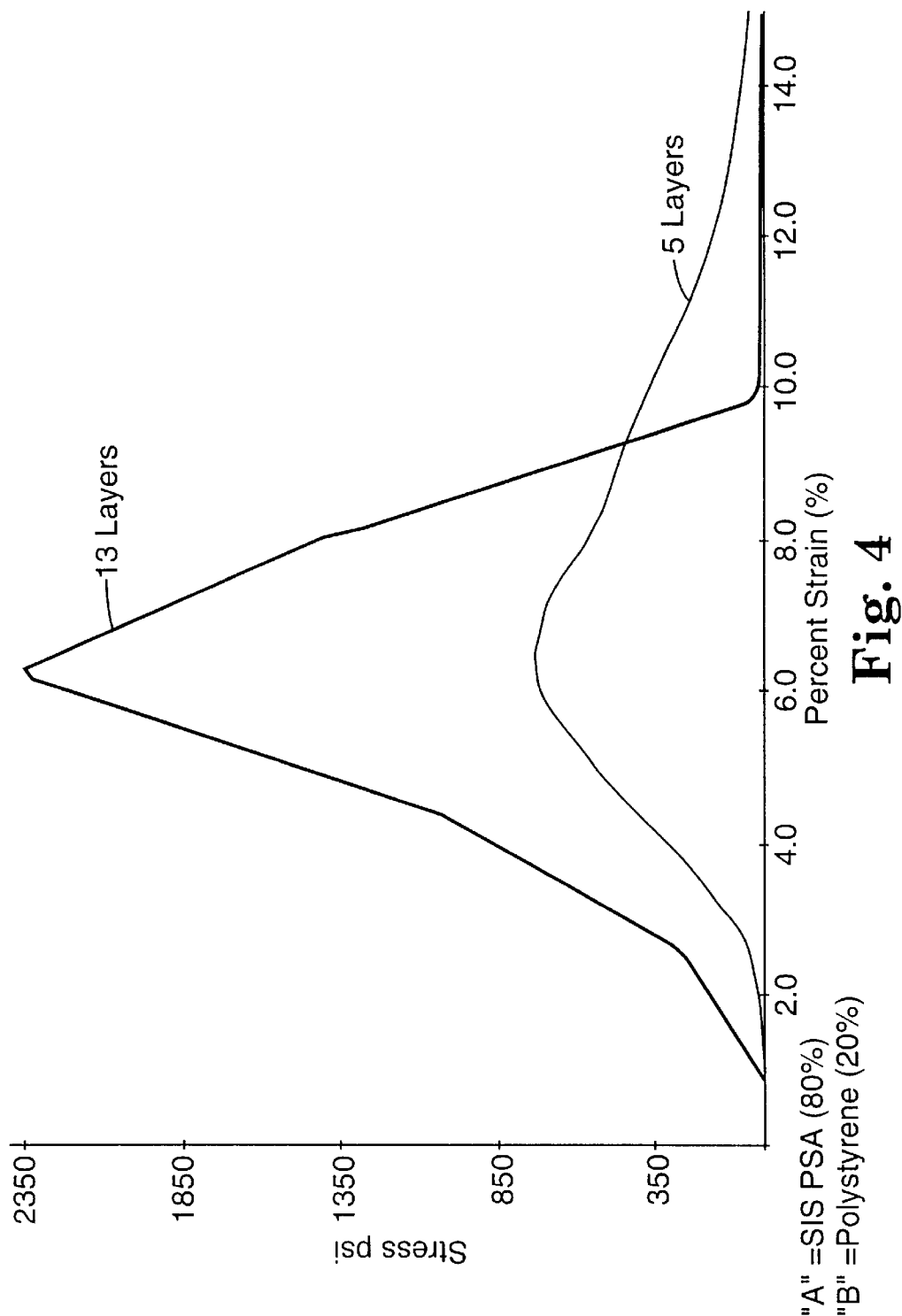
FIG. 4 is a graph of the tensile strength and the percent elongation for multilayer constructions of alternating layers of a tackified styrene-isoprene-styrene block copolymer pressure sensitive adhesive and a polystyrene having similar compositions and having 5 and 13 layers as exemplified in Examples 35–36.

The data indicates that the multilayer films of Examples 35–36 had a yield and break stress that increased with the number of layers. The results for Examples 35 and 36 (i.e., multilayer film constructions having 5 layers and 13 layers, respectively) is visually depicted in FIG. 4. The brittle material of the B layers resulted in a construction that had paper-like tensile, elongation, and tear properties, as shown by the high break stress and low percent elongation of Examples 35–38.

Examples 39–40, Comparative Example N

Examples 39 and 40 were multilayer films having 61 layers of a construction $A(BA)_{29}BA$. They were prepared to illustrate the effect of the nonpressure sensitive B layer on the tensile properties.

Examples 39 and 40 were made in a similar manner as Example 18 except EXACT 4023 was used in place of DOWLEX 2517. Also, the extruder and line speeds were adjusted to yield films with an overall thickness of 250 micrometers and a calculated weight ratio of A:B of 95:5 and 87:13 for Examples 39 and 40, respectively. Comparative Example N is the same as Comparative Example G.

Examples 39–40 and Comparative Example N were tested for tensile properties to determine the yield stress, break stress and elongation. The A:B weight ratio, overall film thickness, and test results are shown in Table 14.

TABLE 14

| Example | A:B Weight Ratio | Thickness ($\mu$m) | Yield Stress (Mpa) | Break Stress (Mpa) | Elongation (%) |
|---|---|---|---|---|---|
| Comp. Ex. N (31 layers) | 100:0 | 53 | — | 2.1 | 1280 |
| 39 (61 layers) | 95:5 | 48 | 0.9 | 3.5 | 1110 |
| 40 (61 layers) | 87:13 | 30 | 1.6 | 4.8 | 1210 |

As seen in the above table, the multilayer films of Examples 39 and 40 demonstrated significantly more tensile strength and the presence of a yield stress compared to the pressure sensitive adhesive by itself. As a result, using nonpressure sensitive adhesive materials in the B layers, the tape has sufficient tensile strength to handle and convert without stringing.

Examples 41–47

Examples 41–47 were multilayer films having a construction of $A(BA)_nBA$. They were prepared to illustrate the effect of composition and number of B layers.

Example 41 was made in a similar manner as Example 14 except DOWLEX 2517 was used instead of EXACT 4023, the line speed was 26.8 m/min. and the weight ratio of A:B was calculated to be 71:29.

Example 42 was made in a similar manner as Example 18 except the line speed was reduced to increase the overall thickness to 137 micrometers.

Example 43 was made in a similar manner as Example 37 except the process conditions were adjusted to result in a calculated weight ratio of A:B of 89:11.

Example 44 was made in a similar manner as Example 12 except the process conditions were adjusted to result in a calculated weight ratio of A:B of 79:21.

Example 45 was made in a similar manner as Example 14 except the process conditions were adjusted to result in a calculated weight ratio of A:B of 50:50 and an overall thickness of 25 micrometers.

Example 46 was made in a similar manner as Example 13 except no acryloxybenzophenone was added to the pressure sensitive adhesive in the A layers and the process conditions were adjusted to result in a calculated weight ratio of A:B of 85:15.

Example 47 was made in a similar manner as Example 43 except PELLETHANE 2352-70A was used instead of EASTAR 6763 and the process conditions were adjusted to result in a calculated weight ratio of A:B of 73:27 and an overall thickness of 51 micrometers.

Examples 41–47 were tested for tensile properties to determine the yield stress, break stress and elongation. The A:B weight ratio, overall film thickness, and test results were reported in Table 15, along with the test results of Example 40.

TABLE 15

| Example | A:B Weight Ratio | Thickness (μm) | Yield Stress (Mpa) | Break Stress (Mpa) | Elongation (%) |
|---|---|---|---|---|---|
| 40 | 87:13 | 30 | 1.6 | 4.8 | 1210 |
| 41 (5 layers) | 71:29 | 25 | 3.0 | 2.4 | 530 |
| 42 (61 layers) | 71:29 | 137 | 2.9 | 5.0 | 840 |
| 43 (13 layers) | 89:11 | 152 | 3.2 | 4.1 | 560 |
| 44 (61 layers) | 79:21 | 61 | 2.4 | 16.9 | 615 |
| 45 (5 layers) | 50:50 | 25 | 1.9 | 5.9 | 780 |
| 46 (61 layers) | 85:15 | 51 | — | 4.0 | 570 |
| 47 (13 layers) | 73:27 | 51 | — | 5.0 | 510 |

Figure 5:
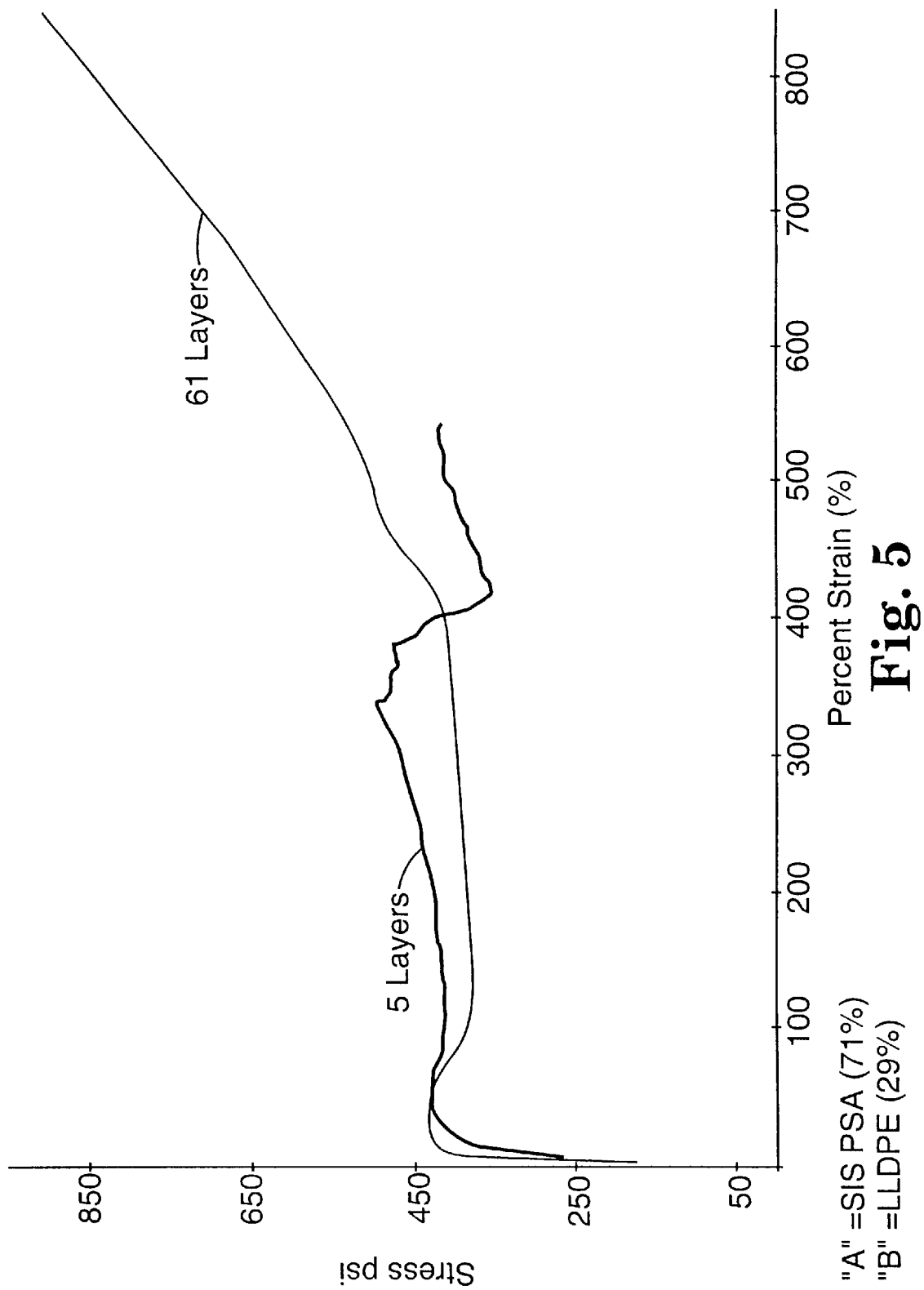
FIG. 5 is a graph of the tensile strength and the percent elongation for multilayer constructions of alternating layers of a tackified styrene-isoprene-styrene (SIS) block copolymer pressure sensitive adhesive and a linear low density polyethylene (LLDPE) having 5 and 61 layers as exemplified in Examples 41 and 42. Both constructions have similar weight ratios of tackified SIS and LLDPE.
Figure 6:
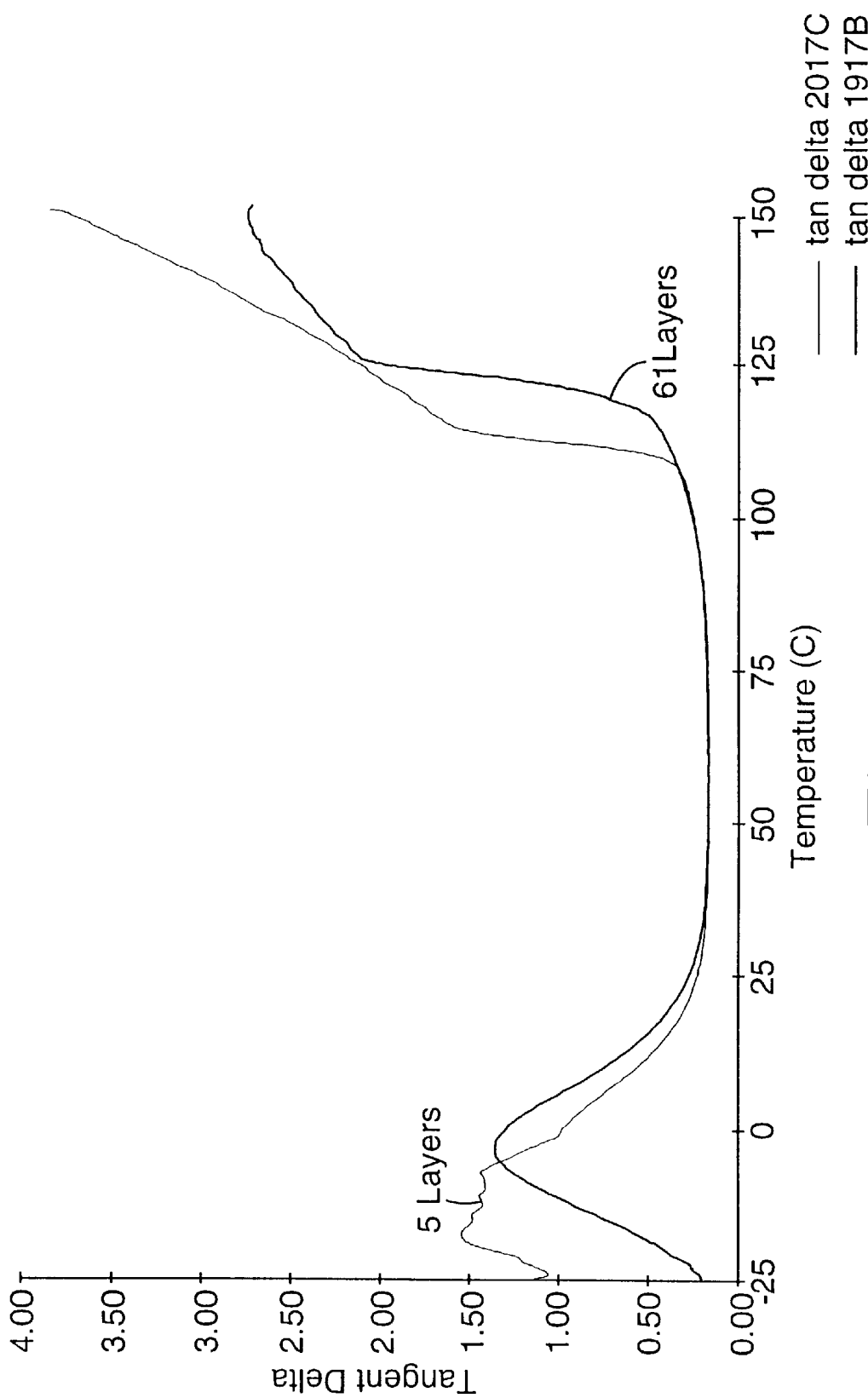
FIG. 6 is a graph of the DMA spectrum for multilayer constructions of alternating layers of a tackified styrene-isoprene-styrene block copolymer pressure sensitive adhesive and a linear low density polyethylene having 5 and 61 layers as exemplified in Examples 41 and 42.

Once again, the break energy increased as the number of layers increased (e.g., Example 41 versus Example 42), as shown in FIG. 5. Concurrently, the melting point of the overall construction increased as the number of layers increased, as shown in the DMA spectrum for Example 41 and Example 42 in FIG. 6.

Examples 48–49, Comparative Example O

Examples 48 and 49 were multilayer films of a construction of A(BA)$_{29}$BA. They were prepared to illustrate the ability to build an tailor tensile properties by adding relatively low amounts of a nonpressure sensitive adhesive material.

Example 48 was made in a similar manner as Example 12 and Example 49 was made in a similar manner as Example 12. However, in Examples 48 and 49, PELLETHANE 2352-70A was used in place of PEBAX 5533. Comparative Example O was similar to Comparative Example D, and was 31 layers of Acrylate PSA B.

Examples 48–49 and Comparative Example O were tested for tensile properties to determine the yield stress, break stress, and elongation. The A:B weight ratio, overall film thickness, and test results are shown in Table 16.

TABLE 16

| Example | A:B Weight Ratio | Thickness (μm) | Yield Stress (Mpa) | Break Stress (Mpa) | Elongation (%) |
|---|---|---|---|---|---|
| Comp. Ex. O (31 layers) | 100:0 | 61 | — | 0.7 | 875 |
| 48 (61 layers) | 91:9 | 61 | 1.0 | 6.5 | 620 |
| 49 (61 layers) | 91:9 | 61 | — | 3.8 | 960 |

The data indicates that multilayer films of Examples 48–49 had significantly higher stress and elongation to break than that the pressure sensitive adhesive by itself. The elastic-recoverable tensile properties can be tailored and increased relative to those of the pressure sensitive adhesive layers.

Each of the patents, patent applications, and publications cited herein is incorporated by reference as if each were individually incorporated by reference. The various modifications and alterations of this invention will be apparent to those skilled in the art without departing from the scope and spirit of this invention. This invention should not be restricted to that set forth herein for illustrative purposes only.

What is claimed is:

1. A multilayer film having a unified construction of at least 10 substantially contiguous layers of organic polymeric material, wherein at least one internal layer comprises a pressure sensitive adhesive material.

2. The multilayer film of claim 1 having a total thickness of no greater than about 250 micrometers.

3. The multilayer film of claim 1 having at least three layers comprising the same pressure sensitive adhesive material.

4. The multilayer film of claim 1 wherein the unified construction comprises layers comprising a pressure sensitive adhesive material alternating with layers comprising a material that is not a pressure sensitive adhesive.

5. The multilayer film of claim 4 wherein the construction comprises at least 13 such alternating layers.

6. A multilayer film having a unified construction of at least 10 substantially contiguous layers comprising layers which comprise a pressure sensitive adhesive alternating with layers comprising a nontacky thermoplastic material.

7. The multilayer film of claim 6 wherein the nontacky thermoplastic material is elastomeric.

8. A multilayer film having a unified construction of at least 10 substantially contiguous layers comprising layers which comprise a pressure sensitive adhesive alternating with layers comprising an elastomer that is not a pressure sensitive adhesive.

9. The multilayer film of claim 6 wherein each layer comprising a pressure sensitive adhesive material comprises a mixture of two or more different pressure sensitive adhesive materials.

10. The multilayer film of claim 6 wherein each layer comprising a pressure sensitive adhesive material comprises a mixture of at least one pressure sensitive adhesive material and at least one material that is not a pressure sensitive adhesive.

11. The multilayer film of claim 4 comprising at least three layers comprising the same material that is not a pressure sensitive adhesive.

12. The multilayer film of claim 4 wherein all the layers comprising a pressure sensitive adhesive comprise the same pressure sensitive adhesive material.

13. A multilayer film having a unified construction of at least 10 substantially contiguous layers of organic polymeric material, in which layers comprising pressure sensitive adhesive alternate with layers that are not pressure sensitive adhesives, having two outermost layers comprising a pressure sensitive adhesive material.

14. The multilayer film of claim 4 having two outermost layers comprising a material that is not a pressure sensitive adhesive.

15. A multilayer film having a unified construction of at least 10 substantially contiguous layers of organic polymeric material, in which layers comprising pressure sensitive adhesive alternate with layers that are not pressure sensitive adhesives, wherein the two outermost layers comprise different materials.

16. A multilayer film having a unified construction of at least 10 substantially contiguous layers of organic polymeric material, in which layers comprising pressure sensitive adhesive alternate with layers that are not pressure sensitive adhesives, having only one outermost layer comprising a pressure sensitive adhesive material.

17. A multilayer film having a unified construction of at least 10 substantially contiguous layers of organic polymeric material, in which layers comprising pressure sensitive adhesive alternate with layers that are not pressure sensitive adhesives having internal layers of no greater than about 5 micrometers thick.

18. A multilayer film having a unified construction of at least 10 substantially contiguous layers of organic polymeric material, in which layers comprising pressure sensitive adhesive alternate with layers that are not pressure sensitive adhesives, having two outermost layers, each being no greater than about 150 micrometers thick.

19. A multilayer film having a unified construction of at least 10 substantially contiguous layers of organic polymeric material, wherein at least one internal layer comprises a pressure sensitive adhesive, which multilayer film is oriented.

20. The multilayer film of claim 19 which is oriented in one direction.

21. A multilayer film having a unified construction of at least 10 substantially contiguous layers of organic polymeric material, wherein at least one internal layer comprises a pressure sensitive adhesive which is further characterized by having a layer comprising a pressure sensitive adhesive material, a layer comprising a material that is not a pressure sensitive adhesive, and a tie layer therebetween.

22. The multilayer film of claim 1 wherein at least one layer comprises a flame retardant.

23. The multilayer film of claim 1 wherein the unified construction comprises layers comprising a first pressure sensitive adhesive material alternating with layers comprising a second pressure sensitive adhesive which is a different material from the first pressure sensitive adhesive material.

24. A multilayer film having a unified construction and a total thickness of no greater than about 250 micrometers; wherein the construction comprises at least 5 substantially contiguous layers of organic polymeric material; the construction comprising layers comprising a pressure sensitive adhesive material alternating with layers comprising a material that is not a pressure sensitive adhesive.

25. The multilayer film of claim 24 wherein the construction comprises at least 10 layers.

26. The multilayer film of claim 24 wherein at least one layer comprises a flame retardant.

27. A multilayer film having a unified construction comprising at least 5 substantially contiguous and alternating layers of different pressure sensitive adhesive materials.

28. The multilayer film of claim 27 wherein the unified construction has a total thickness of no greater than about 250 micrometers.

29. The multilayer film of claim 27 wherein the construction comprises at least 10 layers.

30. The multilayer film of claim 1 wherein the unified construction comprises layers comprising a pressure sensitive adhesive material selected from the group consisting of tackified natural rubbers, tackified synthetic rubbers, tackified styrene block copolymers, self-tacky acrylate copolymers, tackified acrylate copolymers, tackified methacrylate copolymers, self-tacky poly-α-olefins, tackified poly-or-olefins, and tackified silicones.

31. The multilayer film of claim 24 wherein the unified construction comprises layers comprising a pressure sensitive adhesive material selected from the group consisting of tackified natural rubbers, tackified synthetic rubbers, tackified styrene block copolymers, self-tacky acrylate copolymers, tackified acrylate copolymers, tackified methacrylate copolymers, self-tacky poly-α-olefins, tackified poly-α-olefins, and tackified silicones.

32. A multilayer film having a unified construction of at least 10 substantially contiguous layers comprising layers which comprise crosslinked pressure sensitive adhesive alternating with layers comprising a material that is not a pressure sensitive adhesive.

* * * * *

UNITED STATES PATENT AND TRADEMARK OFFICE
CERTIFICATE OF CORRECTION

PATENT NO. : 6,045,895
DATED : Apr. 4, 2000
INVENTOR(S) : Patrick D. Hyde, Richard A. Kollaja, Dennis L. Krueger and Douglas A. Devens, Jr.

It is certified that error appears in the above-indentified patent and that said Letters Patent is hereby corrected as shown below:

On the Title Page,

Item 75, please delete "; Gregory B. Gadbois, Maplewood, both of " such that the correct inventors section is as follows:

Patrick D. Hyde, Burnsville; Richard A. Kollaja, St. Paul; both of Minn.; Dennis L. Krueger, Hudson, Wis.; Douglas A. Devens, Jr., St. Paul, Minn.

Signed and Sealed this

Twentieth Day of March, 2001

Attest:

NICHOLAS P. GODICI

Attesting Officer

Acting Director of the United States Patent and Trademark Office